(12) United States Patent
Devasia et al.

(10) Patent No.: US 7,035,042 B2
(45) Date of Patent: Apr. 25, 2006

(54) FAST POSITIONING OF DISK DRIVES AND OTHER PHYSICAL SYSTEMS

(75) Inventors: Santosh Devasia, Seattle, WA (US); Qingze Zou, Seattle, WA (US); Dhanakorn Iamratanakul, Seattle, WA (US); Héctor Ramiro Pérez Rodriguez, Bucaramaanga (CO)

(73) Assignee: University of Washington, Seattle, WA (US)

( * ) Notice: Subject to any disclaimer, the term of this patent is extended or adjusted under 35 U.S.C. 154(b) by 224 days.

(21) Appl. No.: 10/718,862

(22) Filed: Nov. 21, 2003

(65) Prior Publication Data

US 2004/0233570 A1    Nov. 25, 2004

Related U.S. Application Data

(60) Provisional application No. 60/428,896, filed on Nov. 22, 2002.

(51) Int. Cl.
*G11B 5/596* (2006.01)

(52) U.S. Cl. ............... 360/78.09; 318/560; 360/77.02; 360/78.06

(58) Field of Classification Search .............. None
See application file for complete search history.

(56) References Cited

U.S. PATENT DOCUMENTS

2003/0035241 A1* 2/2003 Gregg ............... 360/78.09
2003/0189784 A1* 10/2003 Galloway .......... 360/78.06

OTHER PUBLICATIONS

Dorf, R.C. and Bishop, R. H. Picture From Modern Control Systems. Chapter 1, Introduction to Control Systems. Undated P. 24. Prentice Hall 1 pg.

* cited by examiner

*Primary Examiner*—Andrew L. Sniezek
(74) *Attorney, Agent, or Firm*—Ronald M. Anderson

(57) ABSTRACT

A method useful to change a system's output from one value to another within a prescribed time-interval in an optimal manner using optimization criteria such as minimal time (e.g., to increase throughput) or minimal energy (e.g., to reduce heat dissipation and reduce induced vibrations). Optimal design of maneuvers (such as fast seek and scanning) that rapidly change the output from one value to another, arise in flexible structure applications, including rapidly positioning the end-point of large-scale space manipulators, positioning of read/write heads of disk-drive servo systems, which are relatively medium-scale flexible structures, and nano-scale positioning and manipulation using relatively small-scale piezo actuators. Maintaining a position of an element constant outside of the transition time-interval is critical in many applications. For example, in disk-drive applications, read and write operations cannot be performed (before and after the output transition) if the output position is not precisely maintained at a desired track.

26 Claims, 4 Drawing Sheets

FAST POSITIONING OF DISK DRIVES AND OTHER PHYSICAL SYSTEMS

RELATED APPLICATIONS

The present application is based upon co-pending U.S. provisional patent application Ser. No. 60/428,896, filed Nov. 22, 2002, the benefit of the filing date of which is claimed under 35 U.S.C. § 119(e).

GOVERNMENT RIGHTS

The present invention was developed with funding provided under National Science Foundation Contract No. CMS 0196214, and National Aeronautics and Space Administration Contract No. NAG 2-1450, and the federal government may therefore have rights in the present invention.

FIELD OF THE INVENTION

The present invention pertains to a method for precise, fast positioning of a physical component, and more specifically, to a method for precise, fast positioning of read/write heads in disk drives and other such components using an actuating force applied to the component during and outside a time interval during which the component is actually moved from an initial position to a different desired position.

BACKGROUND OF THE INVENTION

A fundamental control problem is determining a suitable input signal to drive a physical component from a first position (at time $t_i$) to a second position (at time $t_f$) during an output-transition time interval, $t_i$–$t_f$. This problem arises in controlling a driver for almost any form of physical component that is rapidly positioned. In many such control applications, the controlled component must be precisely positioned both at a first position, before the output-transition time interval, and at a second position, after the output-transition time interval. Performing fast maneuvers with flexible structures can introduce severe vibration problems, resulting in loss of positioning precision after the completion of an output transition and inefficiency in the positioning process. For example, when positioning a read/write head of a disk drive, read or write operations cannot be performed before or after an output transition that moves the head, if the output position is not precisely maintained at the desired track. Residual vibrations arising due to the elastic flexibility of the head support structure may require a prohibitively long time to settle out, increasing the working cycle time, since the read/write head cannot perform a next task until the vibrations are reduced to an acceptable level. Accordingly, it is very important in such control applications to achieve output transitions without residual vibrations.

As opposed to the problem of changing the output-point on a flexible structure, the problem of changing the complete configuration, i.e., the state of system such as a flexible structure, has been well studied in prior literature. These techniques, which solve the state-to-state transition problem (sometimes referred to as the state-transition problem), can also be used to find a solution to the output-transition problem. In particular, output transitions without residual vibrations can be obtained by requiring that the flexible system maneuver between equilibrium configurations (rigid-body rest configurations). These rest states are chosen to achieve initial and final output values at the beginning and end of the output transition. Once the boundary states at the beginning and end of output transition are chosen to be the rest states, then a solution to the output-transition problem can be found by solving the standard, optimal (e.g., minimum-energy), state-transition problem from the initial state to the final state, which is referred to as the "rest-to-rest state-transition approach." However, the solution found with this choice of the boundary states may not lead to an optimal output-transition. On the other hand, arbitrary choices of the boundary states are also not acceptable, because they may not allow the output to be maintained at a constant value after the completion of the output-transition, i.e., without residual vibrations, for any choice of the input. Therefore, standard optimal state-to-state transition approaches cannot be used to directly solve the optimal output-transition problem.

Clearly, a better approach is needed that permits the input required to achieve an optimal output transition. In addition to enabling a minimum input energy to be achieved, it would also be desirable to enable other optimal criteria, such as achieving a minimum time for a transition, to be applied in determining the input needed to achieve the desired goal.

SUMMARY OF THE INVENTION

One aspect of the present invention is directed to a method for controlling an element that is part of a system so that when it is necessary to reposition the element, the element is moved between a first position and a second position during a transition-time interval. More importantly, the element is controlled so that it only moves during the transition-time interval and is precisely positioned both immediately before and after the transition-time interval. Also, more than one element can be moved in accord with these constraints using the present invention. The proposed invention can thus be applied to control multiple elements, provided there are multiple inputs in the system. The method uses a model of the system that includes the element to determine the appropriate control input signal. The model will encompass the nature of the system and the movable element, and the manner in which the element is to be moved. Using the model, the method characterizes the internal dynamics of the system in which energy applied to the system outside the transition-time interval is hidden, so that the element does not move other than during the transition-time interval. For a selected optimization criterion, optimal internal states are then determined at a beginning and an end of the transition-time interval in which movement of the element between the first position and the second position is to occur. Based upon the optimal internal states, an optimal control input signal is determined for at least one of a pre-actuation input, a post-actuation input, and a transition-interval input acting on the system. A pre-actuation input applies energy to the system before the transition-time interval, and a post-actuation input applies energy to the system, after the transition-time interval. A transition-interval input applies energy to the system during the transition-time interval. The optimal control input signal is determined so as to cause the element to move from the first position to the second position and to achieve the selected optimization criterion.

The optimization criterion can be selected to achieve different goals. For example, the goal may include, but is not limited to, moving one or more elements between a first position and a second position with substantially a minimum input energy, or in substantially a minimum transition-time interval, or to achieve a combination of these goals.

The pre-actuation input is uniquely specified in terms of an unstable internal state component. In contrast, the post-actuation input is uniquely specified in terms of a stable internal state component. The unstable internal state component and the stable internal state component are the only components of the boundary states for the first position and the second position that can be varied to ensure that the element does not move as a result of the energy applied to the system other than during the transition-time.

In a preferred embodiment, the control input signal is defined as a function of a transition state difference related to the difference between the first position and the second position.

The pre-actuation input, the post-actuation input, and the transition-interval input each comprises a signal with periodically varying components at one or more frequencies selected to act on the element without causing the element to move prior to or after the transition-time interval.

In one embodiment, the method includes the step of applying an input signal (the transition-interval input) to move the element during the transition-time interval, as well as the post-actuation input after the transition-time interval. In this embodiment, a pre-actuation input is not employed. Similarly, in another embodiment, an input signal is applied to move the element during the transition-time interval, as well the pre-actuation input before the transition-time interval; however, a post-actuation input is not employed.

One preferred application of the present invention is used to control a read/write head of a nonvolatile memory device so that the head is moved between the first position and the second position to provide access to different portions of a memory medium. Depending upon the application, the element may comprise part of a nonlinear system. As noted above, multiple elements can also be moved in accord with the present invention, provided that multiple inputs are employed in the system.

The element may be moved between the first position and the second position to carry out different functions. For example, depending upon the nature of the element, it may be moved for scanning a surface, reading data, writing data, positioning the element to implement a process, positioning the element to access a desired material, controlling a process, fabricating a component, or controlling the operation of a system in which the element is included.

Another aspect of the present invention is directed to a memory medium on which machine readable instructions are stored for carrying out steps that are generally consistent with the steps of the method described above. Yet another aspect of the present invention is directed to a controller for moving an element that is part of a system, during a transition-time interval, to achieve a selected optimization criterion. The controller includes a memory that stores machine instructions, and a processor that is coupled to the memory and executes the machine instructions to implement functions that are generally consistent with the steps of the method discussed above.

Finally, another aspect of the present invention is directed to a method for moving an element that is part of a system, between a first position and a second position, during a transition-time interval, to achieve at least one of a minimum transition-time interval and a minimum energy for moving the element. The method starts by determining a relative degree of the system. Next, an inverse input for the system is determined. A transformation matrix is then selected to convert system equations that define the system, into an output tracking form, and the system equations are transformed into the output tracking form. Internal dynamics of the system are decoupled, producing decoupled internal dynamics, for which parameters are computed. Finally, an optimal output-transition solution is determined as a function of the parameters so that an optimal control input is defined for adding at least one of a pre-actuation energy and a post-actuation energy to the element without causing movement of the element other than during the transition-time interval.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 8:
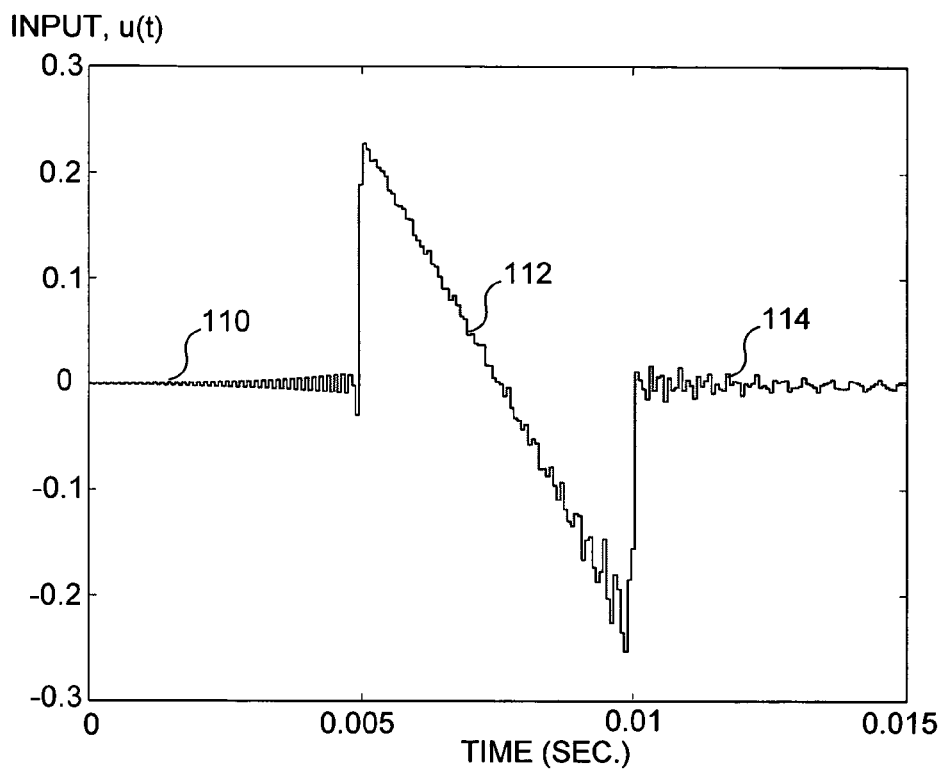
Figure 9:
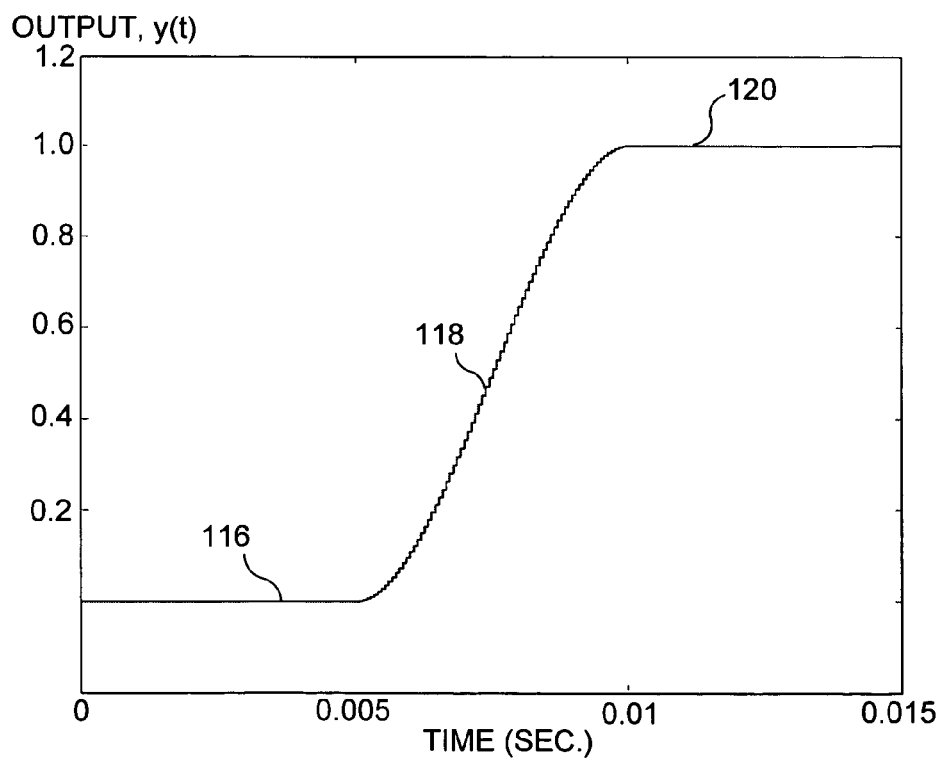

FIG. 8 is a graph showing a discrete input signal applied to the motor used to position the read/write head, where the discrete input signal is determined in accord with the present invention using an optimal output-transition approach, $u_{oot}(t)$; and FIG. 9 is a graph showing the output position of the read/write head as a function of time (optimal output trajectory, $y_{oot}(t)$) in response to the discrete input signal of FIG. 8.

DESCRIPTION OF THE PREFERRED EMBODIMENT

Exemplary Applications of the Present Inventions

The present invention is generally applicable to controlling the movement of almost any physical element that is moved from one position to another. The size of the physical element can range from the nano-scale to the macro-scale. Thus, the present invention can be employed in many different applications and for many different purposes. Detailed examples are provided below showing how the present invention is used for controlling the movement of a read/write head of a disk drive using both a continuously varying control signal and one that varies in discrete steps.

Other exemplary applications of the invention include: positioning silicon wafers during semi-conductor manufacturing; positioning tools during manufacturing and fabrication operations such as drilling and spot welding; positioning land-based or space-based antennae; fast scanning (to achieve a trajectory employed for repetitively returning a scan head to a reset position before repeating a scan along a desired trajectory) for use in graphic scanners, retinal scanners, etc.; designing optimal reset trajectories for cams (i.e., for mechanical cams used in engines and other devices); design of quick return mechanisms used in machines such as shapers and planers that implement to-and-fro movement of a component; positioning sensor probes over a sample such as biological cells being probed, for example, by an atomic force microscope or a scanning tunneling microscope; design of output transition trajectories for chemical reactors, such as continuously stirred tank reactors, so as to minimize waste; and design of trajectories for changing operating conditions of a system, such as changing the lift of an aircraft from helicopter mode to aircraft mode (e.g., in an aircraft such as the OSPREY).

Each of the exemplary applications of the present invention noted above has requirements and parameters that are specific to that application. Accordingly, it will be important to accurately model the system in which the present invention will be employed for controlling the movement of a system element. Some applications will require non-linear models to obtain the input signal for controlling movement of the element, while others will use a linear model to obtain the input signal. In certain applications, the control input signal to move the element will be continuous, while in others, it will be a series of discrete input pulses. The present invention is useful in each of these applications and is readily adapted to meet almost any requirements. By properly modeling the system, it will generally be possible to adapt the present invention to a given application in which efficient movement of an element between positions is desired.

In addition to being useful in a number of very different applications, the present invention enables a user to select a desired optimization criterion. For example, in certain cases, it may be desirable to optimize the energy input to a system to move an element from a first position to a second position. In other instances, the optimization criteria may be moving the element from a first position to a second position in a minimum time. It may also sometimes be desired to optimize both the input energy and the time required to move an element between two positions. These and other optimization criteria can be selected by the user when implementing the present invention to determine the input that will achieve the desired goal.

In a conventional control, energy is typically only applied to move an element during the time at which movement of the element is desired, i.e., between times $t_i$ and $t_f$. An important aspect of the present invention is that it achieves the desired optimization criteria by applying a pre-actuation input and/or a post-actuation input to the element respectively before and after the transition-time interval in which the element is expected to move between a first position and a second position. However, the energy applied before or after the transition-time interval is "hidden" in the system and does not cause the element to move other than during the transition-time interval. Of course, energy will typically also be applied by the transition-interval input during the transition-time interval to move the element. The energy applied as a pre- and/or post-actuation input assists the element in more efficiently moving between the two positions, but the element is stable, and no movement of it occurs except during the transition-time interval. In a system that employs repetitive movement of an element, the movement of the element will only occur during repetitive transition-time intervals; during the remaining time the element will follow a predefined desired output trajectory.

If a pre-actuation input is used, advance knowledge that the element will need to be moved during the transition-time interval is required. In any application of the present invention in which advance knowledge of the movement between two positions cannot occur, the present invention will only apply energy to move the element during the transition-time interval and as a post-actuation input. In other cases, it may be necessary to only apply the pre-actuation input as well as the energy to move the element during the transition-time interval, but not the post-actuation input. These different conditions can readily be met by the present invention and will typically be identified in the model of the system that is used in determining the pre- and/or post-actuation inputs as required.

Controller for Implementing the Present Invention

Figure 1:
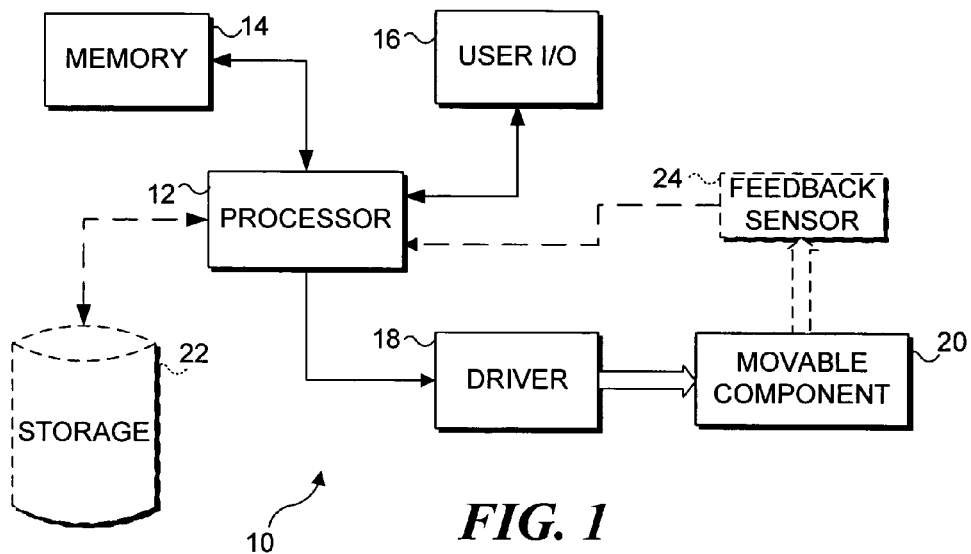
FIG. 1 is a schematic block diagram of a controller for controlling a movable component in accord with the present invention.

Although the present invention is readily implemented on a personal computer or other computing device, a general controller 10 for implementing the present invention is illustrated in FIG. 1. Controller 10 includes a processor 12 that executes a plurality of machine instructions stored in a memory 14. Optionally, a nonvolatile storage 22 such as a hard drive can be used for storing the machine instructions. These software instructions comprise a software program having one or more modules, libraries, and/or other software components. To implement control of a system in accord with the present invention, the machine instructions comprising the software for determining the pre- and/or post-actuation input is loaded into memory 14 from storage 22, or alternatively if nonvolatile storage 22 is not provided, is simply accessed in memory 14 for execution by the processor. While not required in many cases, a user input/output interface 16 may be provided for input of text, or control of this and other programs being executed by processor 12. Upon executing the machine instructions, processor 12 produces a signal that includes either or both of a pre-actuation input and a post-actuation input, as well as the input signal applied during the transition-time interval that will cause a driver 18 to reposition a movable component 20 along a desired trajectory during the transition-time interval. In the following examples, the element is moved between a first position and a second position. Although not required, a feedback sensor 24 may be included to provide a feedback signal indicative of the current actual position of the movable element for comparison to a desired position of the element. If used, feedback sensor 24 provides a feedback signal that is input to processor 12 and employed by it for determining any error that may exist between a desired trajectory or position for the movable element and its actual position.

Further details relating to determining the input signal for controlling a movable element to cause the element to move are discussed below in connection with an exemplary preferred embodiment employed for moving a read/write head of a hard disk drive between two positions.

Figure 2:
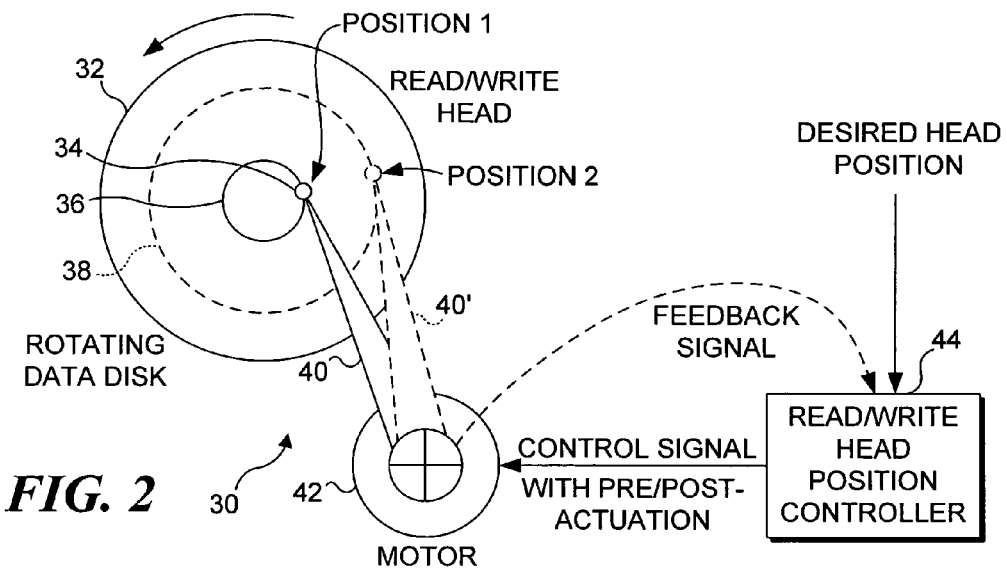
FIG. 2 is a schematic block diagram of an exemplary application of the present invention showing a rotating data disk and a read/write head that is controlled using pre- and/or post-actuation in accord with the present invention.

FIG. 2 schematically illustrates how the present invention is used to control a read/write head 34 of a hard disk. The read/write head is affixed to distal end of the movable arm 40 that is actuated by a motor 42 under control of an input signal provided by a read/write head position controller 44.

Read/write head position controller 44 includes at least processor 12 and memory 14 of controller 10. Read/write head 34 is shown initially at a position 1 where it can be used to read or write to a track 36 on the memory medium provided on a rotating data disk 32. When it is necessary to move to a track 38 corresponding to a position 2, read/write head position controller 44 produces a control signal with pre- and post-actuation inputs, causing motor 42 to efficiently move read/write head 34 from position 1 to position 2. An optional feedback signal provides an indication of any difference or error between the desired trajectory of read/write head 34 as it moves from position 1 to position 2, and its actual trajectory.

Figure 3:
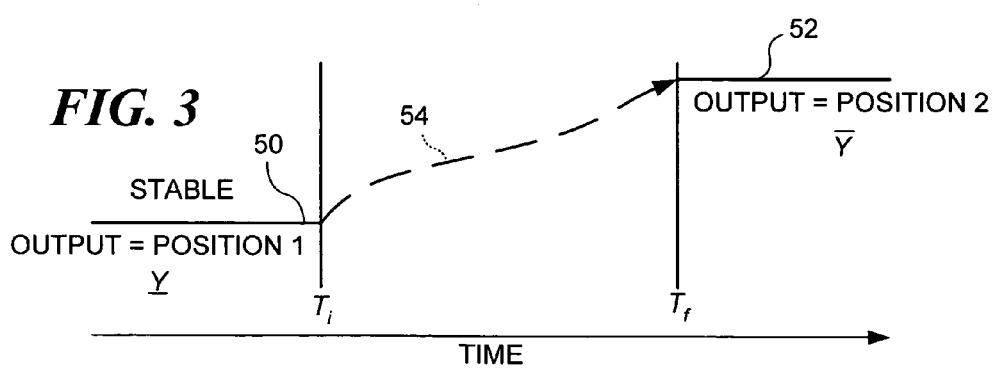
FIG. 3 is a graph showing the position of the read-write head of FIG. 2 as a function of time, when the position of the read/write head is controlled by the controller of FIG. 1.

As indicated by a horizontal line 50 in FIG. 3, read/write head 34 is precisely positioned at position 1 prior to a transition-time interval. Similarly, once the read/write head has reached position 2, it is precisely positioned and does not move, as indicated by a horizontal line 52. Thus, the read/write head does not move prior to a time $T_i$ or after a time $T_f$, which define the beginning and end of the transition-time interval. Prior to moving from position 1, a pre-actuation input is applied to motor 42 but does not cause any movement in read/write head 34 until after time $T_i$. Similarly, the post-actuation input applied to the motor does not cause any movement of read/write head 34 after time $T_f$. However, energy is also applied during the transition-time interval, and the read/write head is efficiently moved along a trajectory 54 (the desired head position) with a minimum energy, as a result of the pre-actuation input, post-actuation input, and the transition-interval input.

Figure 4:
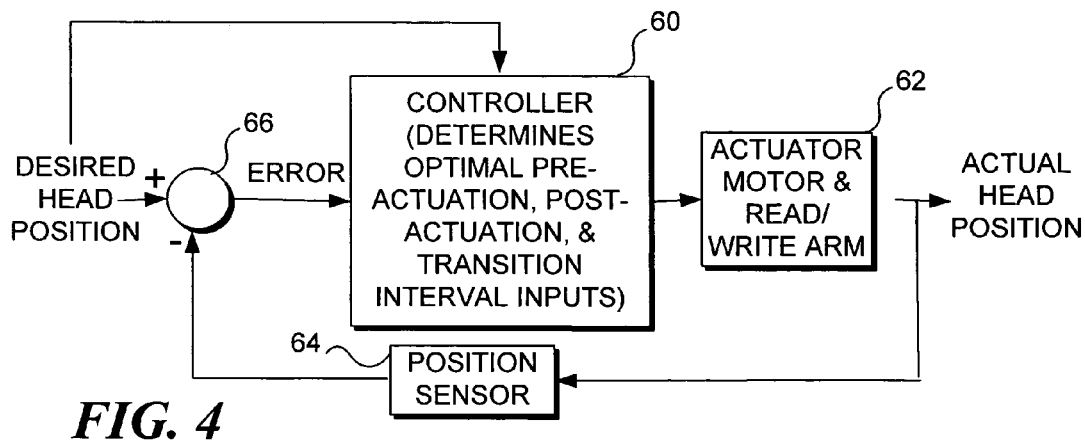
FIG. 4 is a functional block diagram illustrating the control scheme implemented by the controller in positioning the read/write head.

FIG. 4 illustrates the functional block diagram that relates to the control of the read/write head shown in FIG. 2. In this diagram, a controller 60 produces an output signal that is applied to an actuator motor to cause movement of a read/write arm, as indicated in a block 62. The actual position of the head is sensed by a position sensor 64, producing a signal that is subtracted from a desired head position signal (indicated by reference numbers 50, 52, and 54 in FIG. 3) by a summation block 66. The result is an error value, indicating the difference between the desired head position and the actual head position; the error value is provided as a feedback signal to controller 60. Accordingly, compensation will be made for the error in the response of the actuator motor and read/write arm in controlling the position of the read/write head to achieve the desired head position and trajectory, which should result from using the input signals (pre-actuation input, post-actuation input, and the transition-interval input) determined by the present invention.

Figure 5:
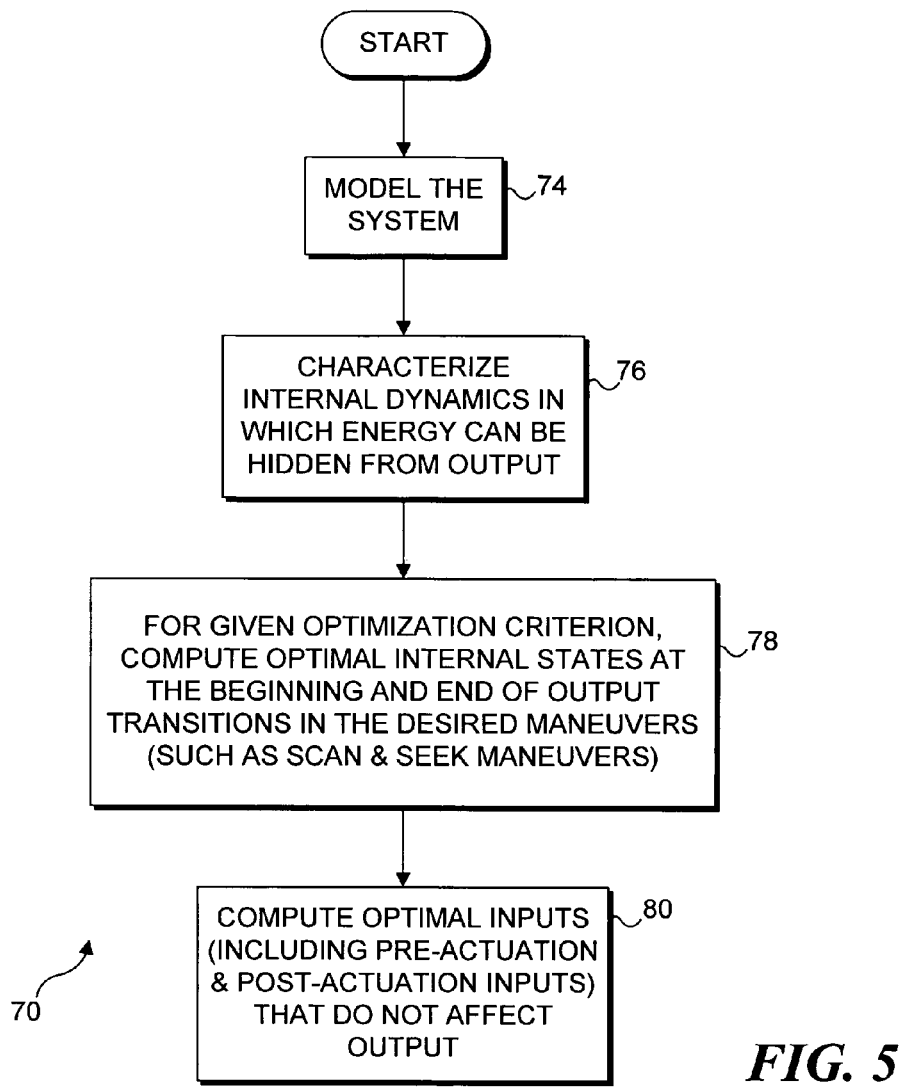
FIG. 5 is a flow chart illustrating the overall steps employed in the present invention.

FIG. 5 includes a flow chart 70 showing the logical steps employed in carrying out the present invention. At a step 74, the system in which an element is to be moved from one position to another is modeled. As noted above, different applications of the present invention will involve different kinds of systems and different criteria and parameters related to moving an element. Thus, by modeling the system in step 74, the constraints and other parameters that need to be taken into consideration will be specified and then the present invention determines how to move the element using either both pre-actuation input and post-actuation input, or only one of the pre- and post-actuation inputs, along with the input applied during the transition-time interval.

A step 76 characterizes the internal dynamics of the system in which energy applied either during the pre-actuation input before the start of the transition-time interval and/or during the post-actuation input after the end of the transition-time interval can be hidden, so that the energy does not cause any motion of the element immediately before or after the transition-time interval. Again, the internal dynamics of the system will vary depending upon the model of the system to which the present invention is applied.

In a step 78, for a given optimization criteria such as achieving a minimum energy in moving an element between two positions, or achieving a minimum transition time interval for moving the element, or a combination of the minimum energy and minimum transition-time interval, the logic computes optimal internal states at the beginning and end of the output transitions for the desired movement of the element. For example, if the element is being employed for scan and seek maneuvers, the optimum optimization criteria will likely be to achieve the movement in a minimum time.

A step 80 computes the optimal inputs, including pre-actuation and post-actuation inputs that do not cause any movement other than during the transition-time interval. Considerable detail is provided below in regard to a generalized approach implemented by the present invention, and more specifically, in regard to examples in which a read/write head is moved between a first position and a second position using a continuous input signal in one case, and a discrete input signal in another case. Accordingly, reference to the detailed equations that follow and the two examples should provide clarification as to how the present invention is implemented.

Problem Formulation

Assume that a physical system is represented in state-space form by:

$$\begin{cases} \frac{d}{dt}x(t) = Ax(t) + Bu(t) \\ y(t) = Cx(t) \end{cases}, \forall t \in (-\infty, \infty) \quad (1)$$

where $x(t) \in \Re^n$ is the system state, u(t) is the input, and y(t) is the output at time t.

Definition 1: The output-transition problem is to find bounded input-state trajectories $\{u(\cdot), x_{ref}(\cdot)\}$ that satisfy the system of Eq. (1) and the following two conditions:

The output-transition condition: The output is transferred from an initial value $\underline{y}$ to a final value $\overline{y}$ within the output-transition time interval $[t_i, t_f]$, and is maintained constant at the desired value before and after the output transition, i.e., $y_{ref}(t) = \underline{y} = C\underline{x}$ for $\forall t \leq t_i$ $y_{ref}(t) = \overline{y} = C\overline{x}$ for $\forall t \leq t_f$ \quad (2)

The delimiting condition: The state approaches the equilibrium configuration as time goes to (plus or minus) infinity, i.e., $x_{ref} \to \underline{x}$ as $t \to -\infty$; and $x_{ref} \to \overline{x}$ as $t \to \infty$ \quad (3)

Definition 2: The optimal (minimum-energy) output-transition problem (OOT) is to find bounded input-state trajectories $\{u(\cdot), x_{ref}(\cdot)\}$ that solve the output-transition problem (Definition 1), and minimize the following input-energy cost functional, $$J_{oot} := \int_{-\infty}^{\infty} [u(t)]^2 \, dt \quad (4)$$

Determining the OOT Solution

The first step in solving this problem is to determine the relative degree of a system, which is defined as the minimum number of times the output must be differentiated so that the input appears explicitly in the output equation. For example, if the output y(t) in Eq. (1) is differentiated with respect to time, the following result is obtained.

$$y(t) = Cx(t) \tag{5}$$

$$\frac{d}{dt}y(t) = C\frac{d}{dt}x(t)$$
$$= CAx(t) + CBu(t)$$

If the term $CB \neq 0$, then the system has a relative degree of 1 since the input term u(t) explicitly appears in the output equation, i.e., in Eq. (6). If the term $CB=0$, it is necessary to differentiate again. In this case (when $CB=0$), the second derivative of the output is obtained as:

$$\frac{d}{dt}y(t) = CAx(t), \quad \text{(since the term } CB = 0\text{)} \tag{6}$$

$$\frac{d^2}{dt^2}y(t) = CA\frac{d}{dt}x(t)$$
$$= CA^2x(t) + CABu(t)$$

Similarly, if the term $CAB \neq 0$, then the system has a relative degree of 2. If the $CAB=0$, it will be necessary to continue taking a next higher derivative of the output, until the input term explicitly appears. The system has a relative degree of r, if the term $CA^{r-1}B$ in the $r^{th}$-derivative of the output is not equal to zero and the terms, CB, CAB, $CA^2B$, ..., $CA^{r-2}B$ (in the preceding derivatives) are all equal to zero, i.e., $$\frac{d^r}{dt^r}y(t) = CA^{r-1}\frac{d}{dt}x(t) \tag{7}$$
$$= CA^r x(t) + CA^{r-1}Bu(t)$$

Next, it is necessary to find the inverse input for the system. The inverse input that maintains output tracking, i.e., $$\frac{d^r}{dt^r}y(t) = \frac{d^r}{dt^r}y_d(t),$$

can be obtained from Eq. (7), as:

$$u_{inv}(t) := \frac{1}{CA^{r-1}B}\left[\frac{d^r}{dt^r}y_d(t) - CA^r x(t)\right] \tag{8}$$

where $y_d(t)$ is the desired output trajectory.

The third step is to choose the transformation matrix that will be used to convert the system equations into the output-tracking form. The transformation matrix $T_{\xi\eta}$ is invertible, i.e., $$T_{\xi\eta} := \begin{bmatrix} C \\ CA \\ \vdots \\ CA^{r-1} \\ \cdots \\ T_\eta \end{bmatrix} \tag{9}$$

The transformation matrix $T_{\xi\eta}$ partitions the state x(t) into two components: (i) the first r terms are the output and its derivatives up to the order r–1 (denoted by $\xi$), and, (ii) the remaining components are called the internal state of the system (denoted by $\eta$), i.e., $$T_{\xi\eta}x(t) = \begin{bmatrix} \xi(t) \\ \cdots \\ \eta(t) \end{bmatrix} := \begin{bmatrix} y(t) \\ \frac{d}{dt}y(t) \\ \vdots \\ \frac{d^{r-1}}{dt^{r-1}}y(t) \\ \cdots \\ \eta(t) \end{bmatrix} \tag{10}$$

The transformation matrix $T_{\xi\eta}$ (from Eq. (9)) and the inverse input from Eq. (8) are applied to the system defined by Eq. (1), as follows. First, multiply the transformation matrix $T_{\xi\eta}$ from Eq. (9) times the state equation from Eq. (1):

$$T_{\xi\eta}\frac{d}{dt}x(t) = T_{\xi\eta}Ax(t) + T_{\xi\eta}Bu(t)$$

$$\begin{bmatrix} \frac{d}{dt}\xi(t) \\ \frac{d}{dt}\eta(t) \end{bmatrix} = T_{\xi\eta}AT_{\xi\eta}^{-1}\begin{bmatrix} \xi(t) \\ \eta(t) \end{bmatrix} + T_{\xi\eta}Bu(t)$$

Then apply the inverse input from Eq. (8) to the above-transformed state equation:

$$\begin{bmatrix} \frac{d}{dt}\xi(t) \\ \frac{d}{dt}\eta(t) \end{bmatrix} = T_{\xi\eta}AT_{\xi\eta}^{-1}\begin{bmatrix} \xi(t) \\ \eta(t) \end{bmatrix} + T_{\xi\eta}Bu_{inv}(t) \tag{11}$$

$$= T_{\xi\eta}AT_{\xi\eta}^{-1}\begin{bmatrix} \xi(t) \\ \eta(t) \end{bmatrix} +$$

$$T_{\xi\eta}B\left\{\frac{1}{CA^{r-1}B}\left[\frac{d^r}{dt^r}y_d(t) - CA^r x(t)\right]\right\}$$

$$= \left(T_{\xi\eta}AT_{\xi\eta}^{-1} - \frac{T_{\xi\eta}BCA^r T_{\xi\eta}}{CA^{r-1}B}\right)\begin{bmatrix} \xi(t) \\ \eta(t) \end{bmatrix} +$$

$$\frac{T_{\xi\eta}B}{CA^{r-1}B}\frac{d^r}{dt^r}y_d(t)$$

$$:= \begin{bmatrix} A_{\xi\xi} & 0 \\ A_{\eta\xi} & A_{\eta\eta} \end{bmatrix}\begin{bmatrix} \xi(t) \\ \eta(t) \end{bmatrix} + \begin{bmatrix} B_\xi \\ B_\eta \end{bmatrix}\frac{d^r}{dt^r}y_d(t),$$

where the matrix $A_{\eta\eta}$ has dimension $(n-r)\times(n-r)$. (In the preceding expression, r is the relative degree and n is the number of states of the system). Since the inverse input was chosen as the input to Eq. (8), the result is:

$$\xi(t) = \begin{bmatrix} y_d(t) \\ \frac{d}{dt}y_d(t) \\ \vdots \\ \frac{d^{r-1}}{dt^{r-1}}y_d(t) \end{bmatrix} := \xi_d(t) \qquad (12)$$

Rewriting the original system from Eq. (1) in the output-tracking form yields:

$$\frac{d}{dt}\xi(t) = \frac{d}{dt}\xi_d(t) \qquad (13)$$

$$\frac{d}{dt}\eta(t) = A_{\eta\eta}\eta(t) + [A_{\eta\xi} \quad B_\eta]\vec{Y}_d(t) \qquad (14)$$

$$:= A_{\eta\eta}\eta(t) + B_{\eta\eta}\vec{Y}_d(t)$$

where the vector $$\vec{Y}_d(t) := \left[\xi(t)^T, \frac{d^r}{dt^r}y_d(t)^T\right]^T$$

$$= \left[y_d(t)^T, \frac{d}{dt}y_d(t), \ldots, \frac{d^r}{dt^r}y_d(t)^T\right]^T$$

represents the desired values of the output. Eq. (14) is called the "internal dynamics" of the system.

Next, to decouple the internal dynamics, a transformation matrix $T_{dc}$ is found such that:

$$T_{dc}^{-1}A_{\eta\eta}T_{dc} = \begin{bmatrix} A_s & 0 & 0 \\ 0 & A_u & 0 \\ 0 & 0 & A_c \end{bmatrix} \qquad (15)$$

where all of the eigenvalues of $A_s \in \Re^{r_s \times r_s}$ have real parts less than zero, all eigenvalues of $A_u \in \Re^{r_u \times r_u}$ have real parts greater than zero, and eigenvalues of $A_c \in \Re^{r_c \times r_c}$ have real parts equal to zero. This matrix transforms the internal state $\eta(t)$ into three states, which are referred to as the strictly stable state, $\eta_s$, the unstable state, $\eta_u$, and the center state, $\eta_c$, i.e., $$T_{dc}^{-1}\eta(t) = \begin{bmatrix} \eta_s(t) \\ \eta_u(t) \\ \eta_c(t) \end{bmatrix}. \qquad (16)$$

The decoupled transformation matrix, $T_{dc}$ from Eq. (16) is applied to the internal dynamics of Eq. (14) as follows.

$$T_{dc}^{-1}\frac{d}{dt}\eta(t) = T_{dc}^{-1}A_{\eta\eta}\eta(t) + T_{dc}^{-1}B_{\eta\eta}\vec{Y}_d(t) \qquad (17)$$

-continued $$\begin{bmatrix} \frac{d}{dt}\eta_s(t) \\ \frac{d}{dt}\eta_u(t) \\ \frac{d}{dt}\eta_c(c) \end{bmatrix} = T_{dc}^{-1}A_{\eta\eta}T_{dc}\begin{bmatrix} \eta_s(t) \\ \eta_u(t) \\ \eta_c(t) \end{bmatrix} + T_{dc}^{-1}B_{\eta\eta}\vec{Y}_d(t)$$

$$:= \begin{bmatrix} A_s & 0 & 0 \\ 0 & A_u & 0 \\ 0 & 0 & A_c \end{bmatrix}\begin{bmatrix} \eta_s(t) \\ \eta_u(t) \\ \eta_c(t) \end{bmatrix} + \begin{bmatrix} B_s \\ B_u \\ B_c \end{bmatrix}\vec{Y}_d(t)$$

In the above decoupled equations, the eigenvalues of $A_s \in \Re^{r_s \times r_s}$ are the minimum-phase zeros of the system of Eq. (1) that lie on the open left half of the complex plane, the eigenvalues of $A_u \in \Re^{r_u \times r_u}$ are the non-minimum phase zeros located in the open right half plane, and the eigenvalues of $A_c \in \Re^{r_c \times r_c}$ are the zeros that lie on the imaginary axis of the complex plane.

In the next step, the transformation matrix T that transforms the original system into the decoupled output-tracking form is computed, as follows.

$$T := \begin{bmatrix} I_{r \times r} & 0 \\ 0 & T_{dc}^{-1} \end{bmatrix} T_{\xi\eta} \qquad (18)$$

where the matrix $I_{r \times r}$ is the r×r identity matrix. The transformation matrix T decouples the state in the following coordinates:

$$x(t) = T^{-1}[\xi(t)^T \quad \eta_s(t)^T \quad \eta_u(t)^T \quad \eta_c(t)^T]^T \qquad (19)$$

$$:= [\Phi_\xi \quad \Phi_{\eta_s} \quad \Phi_{\eta_u} \quad \Phi_{\eta_c}][\xi(t)^T \quad \eta_s(t)^T \quad \eta_u(t)^T \quad \eta_c(t)^T]^T$$

In the preceding expression, the matrices $\Phi_\xi \in \Re^{n \times (n-r)}$, $\Phi_{\eta_s} \in \Re^{n \times (r_s)}$, $\Phi_{\eta_u} \in \Re^{n \times (r_u)}$, and $\Phi_{\eta_c} \in \Re^{n \times (r_c)}$ are the components of the matrix $T^1$ corresponding to each variable $\xi(t)$, $\eta_s(t)$, $\eta_u(t)$, and $\eta_c(t)$, respectively.

Next, the inverse control law expressed in Eq. (8) is rewritten in terms of the decoupled internal states and the known output component $\vec{Y}_d(t)$ (using the decoupled transformation T in Eq. (18)) as:

$$u_{inv}(t) = \frac{1}{CA^{r-1}B}\frac{d^r}{dt^r}y_d(t) - \frac{CA^rT^{-1}}{CA^{r-1}B}\begin{bmatrix} \xi_d(t) \\ \eta_s(t) \\ \eta_u(t) \\ \eta_c(t) \end{bmatrix} \qquad (20)$$

$$:= \frac{1}{CA^{r-1}B}\frac{d^r}{dt^r}y_d(t) + U_\xi\xi(t) + U_s\eta_s(k) +$$

$$U_u\eta_u(k) + U_c\eta_c(k)$$

$$= U_s\eta_s(k) + U_u\eta_u(k) + U_c\eta_c(k) +$$

$$\left[U_\xi \quad \frac{1}{CA^{r-1}B}\right]\begin{bmatrix} \xi_d(t) \\ \frac{d^r}{dt^r}y_d(t) \end{bmatrix}$$

$$:= U_s\eta_s(k) + U_u\eta_u(k) + U_c\eta_c(k) + U_y\vec{Y}_d(t)$$

Several parameters must now be computed, including matrices $W_{pre}$ and $W_{post}$ by solving the following Lyapunov equations.

$$W_{pre}A_u + A_u^T W_{pre} = U_u^T U_u, \text{ and}$$

$$W_{post}A_s + A_s^T W_{post} = -U_s^T U_s$$

The matrices $H_1$ and $H_2$ are computed as:

$$[\Gamma_\xi | \Gamma_{\eta_s} | \Gamma_{\eta_u} | \Gamma_{\eta_c}] := e^{A(t_f - t_i)} T^{-1}$$

$$H_1 := [\Phi_\xi | \Phi_{\eta_u} | \Phi_{\eta_c} | -\Gamma_\xi | -\Gamma_{\eta_s} | -\Gamma_{\eta_c}]$$

$$H_2 := [\Phi_{\eta_s} | -\Gamma_{\eta_u}] \quad (21)$$

The known (constrained) components of the boundary states are then computed as:

$$f := [\underline{\xi}^T \overline{\eta}_u^T \overline{\eta}_c^T \overline{\xi}^T \underline{\eta}_s^T \underline{\eta}_c^T]^T \quad (22)$$

where $[\underline{\xi}^T \underline{\eta}_s^T \underline{\eta}_u^T \underline{\eta}_c^T]^T = \underline{x}^T T^T$, and $[\overline{\xi}^T \overline{\eta}_s^T \overline{\eta}_u^T \overline{\eta}_c^T]^T = \overline{x}^T T^T$.

A matrix known as the controllability grammian is defined as:

$$G_{(t_i, t_f)} := \int_{t_i}^{t_f} e^{A(t_f - \tau)} BB^T e^{A^T(t_f - \tau)} d\tau \quad (23)$$

The gammian can be directly computed by using numerical integration, or alternatively, by solving the differential Lyapunov equation:

$$\frac{d}{dt} P(t) = AP(t) + P(t)A^T + BB^T, \forall t \in (t_i, t_f)$$

with a zero initial condition, i.e., where $P(t_i) = 0$. The controllability gammian can be determined using the latter method as $G_{(t_i, t_f)} = P(t_f)$.

The total cost components are computed as:

$$\Lambda := \begin{bmatrix} W_{post} & 0 \\ 0 & W_{pre} \end{bmatrix} + H_2^T G_{(t_i, t_f)}^{-1} H_2 \quad (24)$$

$$b := \begin{bmatrix} W_{post} \overline{\eta}_s \\ W_{pre} \underline{\eta}_u \end{bmatrix} - H_2^T G_{(t_i, t_f)}^{-1} H_1 \hat{f} \quad (25)$$

$$c := \overline{\eta}_s^T W_{post} \overline{\eta}_s + \underline{\eta}_u^T W_{pre} \underline{\eta}_u + f^T H_1^T G_{(t_i, t_f)}^{-1} H_1 f \quad (26)$$

The optimal boundary condition is computed as:

$$\Psi^* = \begin{bmatrix} \eta_s^* \\ \eta_u^* \end{bmatrix} = \begin{cases} \Lambda^{-1} b, & \text{if } \Lambda \text{ is invertible} \\ \Lambda^\dagger b, & \text{otherwise} \end{cases} \quad (27)$$

where $\Lambda\dagger$ is the pseudo (generalized) inverse of $\Lambda$ satisfying the Moore-Penrose conditions, as explained by Ortega, J. in *Matrix Theory*, Plenum Press, New York, 1987.

To compute the optimal output-transition solution, the optimal control input is first computed as:

$$u_{oot}^*(t) = \begin{cases} U_u e^{A_u(t - t_i)}[\eta_u^* - \underline{\eta}_u] & \text{if } t < t_i \\ B^T e^{A^T(t_f - t)} G_{(t_i, t_f)}^{-1}[x^*(t_f) - e^{A(t_f - t_i)} x^*(t_i)] & \text{if } t_i \le t \le t_f \\ U_s e^{A_s(t - t_f)}[\eta_s^* - \overline{\eta}_s] & \text{if } t > t_f \end{cases} \quad (28)$$

where the optimal boundary states are given by:

$$x^*(t_i) = T^{-1}[\underline{\xi}^T \underline{\eta}_s^T \eta_u^{*T} \underline{\eta}_c^T]^T$$

$$x^*(t_f) = T^{-1}[\overline{\xi}^T \eta_s^{*T} \overline{\eta}_u^T \overline{\eta}_c^T]^T$$

The optimal output-transition cost is computed as:

$$J_{oot}^* = \Psi^{*T} \Lambda \Psi^* - 2\Psi^{*T} b + c \quad (29)$$

Without pre-actuation, the optimal output-transition components are computed as:

$$\tilde{f} := [\underline{\xi}^T \overline{\eta}_u^T \overline{\eta}_c^T \overline{\xi}^T \underline{\eta}_s^T \underline{\eta}_u^T \underline{\eta}_c^T]^T \quad (30)$$

$$\tilde{H}_1 := [\Phi_\xi | \Phi_{\eta_u} | \Phi_{\eta_c} | -\Gamma] \quad (31)$$

$$\tilde{H}_2 := \Phi_{\eta_s} \quad (32)$$

$$\tilde{\Lambda} := W_{post} + \tilde{H}_2^T G_{(t_i, t_f)}^{-1} \tilde{H}_2 \quad (33)$$

$$\tilde{b} := W_{post} \overline{\eta}_s - \tilde{H}_2^T G_{(t_i, t_f)}^{-1} \tilde{H}_1 \tilde{f} \quad (34)$$

$$\tilde{c} := \overline{\eta}_s^T W_{post} \overline{\eta}_s + \tilde{f}^T \tilde{H}_1^T G_{(t_i, t_f)}^{-1} \tilde{H}_1 \tilde{f} \quad (35)$$

The optimal stable internal state is defined by:

$$\tilde{\eta}_s^* = \begin{cases} \tilde{\Lambda}^{-1} \tilde{b}, & \text{if } \tilde{\Lambda} \text{ is invertible} \\ \tilde{\Lambda}^\dagger \tilde{b}, & \text{otherwise} \end{cases} \quad (36)$$

where $\tilde{\Lambda}\dagger$ is the pseudo (generalized) inverse of $\tilde{\Lambda}$ that satisfies the Moore-Penrose conditions, referenced above.

The optimal control input for the output-transition problem without pre-actuation is:

$$\tilde{u}_{oot}^*(t) = \begin{cases} 0 & \text{if } t < t_i \\ B^T e^{A^T(t_f - t)} G_{(t_i, t_f)}^{-1}[\tilde{x}^*(t_f) - e^{A(t_f - t_i)} \underline{x}] & \text{if } t_i \le t \le t_f \\ U_s e^{A_s(t - t_f)}[\tilde{\eta}_s^* - \overline{\eta}_s] & \text{if } t > t_f \end{cases} \quad (37)$$

where the optimal final transition states are computed from:

$$\tilde{x}^*(t_f) = T^{-1}\{[\overline{\xi} \; \tilde{\eta}_s^* \; \overline{\eta}_u \; \overline{\eta}_c]\}^T$$

And, the optimal output-transition without pre-actuation is computed as:

$$\tilde{J}_{oot}^* = [\tilde{\eta}_s^*]^T \tilde{\Lambda}[\tilde{\eta}_s^*] - 2[\tilde{\eta}_s^*]^T \tilde{b} + \tilde{c} \quad (38)$$

Exemplary Application of the Present Invention for Controlling Disk-Drive Servo System—Continuous Dynamics In this example, the present invention is applied to a disk-drive servo system. A disk drive model is used that has one rigid-body mode and four flexible modes at frequencies of 70 Hz, 2200 Hz, 4000 Hz, and 9000 Hz. The input used for positioning of the read/write head of the disk drive is continuous in this model. The system dynamics are described in a linear state-space form by Eq. (1), where the matrices A, B, and C, are given by:

$$A = \begin{bmatrix} 0 & k_y & 0 & 0 & 0 & 0 & 0 & 0 & 0 & 0 \\ 0 & -\frac{k_{fric}}{m} & k_v b_1 & k_v b_2 & k_v b_3 & k_v b_4 & k_v b_5 & k_v b_6 & k_v b_7 & k_v b_8 \\ 0 & 0 & 0 & \omega_1 & 0 & 0 & 0 & 0 & 0 & 0 \\ 0 & 0 & -\omega_1 & -2\zeta_1\omega_1 & 0 & 0 & 0 & 0 & 0 & 0 \\ 0 & 0 & 0 & 0 & 0 & \omega_2 & 0 & 0 & 0 & 0 \\ 0 & 0 & 0 & 0 & -\omega_2 & -2\zeta_2\omega_2 & 0 & 0 & 0 & 0 \\ 0 & 0 & 0 & 0 & 0 & 0 & 0 & \omega_3 & 0 & 0 \\ 0 & 0 & 0 & 0 & 0 & 0 & -\omega_3 & -2\zeta_3\omega_3 & 0 & 0 \\ 0 & 0 & 0 & 0 & 0 & 0 & 0 & 0 & 0 & \omega_4 \\ 0 & 0 & 0 & 0 & 0 & 0 & 0 & 0 & -\omega_4 & -2\zeta_4\omega_4 \end{bmatrix}$$

$$B = \begin{bmatrix} 0 \\ 0 \\ 0 \\ \omega_1 \\ 0 \\ \omega_2 \\ 0 \\ \omega_3 \\ 0 \\ \omega_4 \end{bmatrix}, \text{ and } C = [1\ 0\ 0\ 0\ 0\ 0\ 0\ 0\ 0\ 0]$$

and the plant parameters are given in Table 1, which follows below.

The goal of the optimal output-transition control in this example is to move the position of the end-point (denoted by the output y) of the read/write head by 1 unit within the prescribed output-transition time (i.e., seek time) of 5 msec by using minimum control energy as the objective criterion. During simulations, the output transition starts at time $t_i$=5 msec and ends at time $t_f$=10 msec, and the desired equilibrium states are chosen to be $\underline{x}$=[0 0 0 0 0 0 0 0 0 0], and $\overline{x}$=[1 0 0 0 0 0 0 0 0 0].

TABLE 1

| Parameter | Description | Value | Units |
|---|---|---|---|
| m | moving mass of actuator | 0.200 | kg |
| $k_t$ | force constant | 20.0 | N-Amp$^{-1}$ |
| $k_v$ | normalization factor | $k_t$/m | m-sec$^{-2}$-Amp$^{-1}$ |
| $k_y$ | position measurement gain | 1000 | Volts-m$^{-1}$ |
| $k_{fric}$ | viscous friction coefficient | 2.51 | N-sec-m$^{-1}$ |
| $b_1$ | first resonance coupling | −0.00575 | — |
| $b_2$ | first resonance coupling | 0.0000115 | sec$^{-1}$ |
| $b_3$ | second resonance coupling | 0.0230 | — |
| $b_4$ | second resonance coupling | 0.00 | sec$^{-1}$ |
| $b_5$ | third resonance coupling | 0.8185 | — |
| $b_6$ | third resonance coupling | 0.0 | sec$^{-1}$ |
| $b_7$ | fourth resonance coupling | 0.1642 | — |
| $b_8$ | fourth resonance coupling | 0.0273 | sec$^{-1}$ |

TABLE 1-continued

| Parameter | Description | Value | Units |
|---|---|---|---|
| $\omega_1$ | resonance: voice coil motor isolator | 2π70 | rad sec$^{-1}$ |
| $\omega_2$ | resonance: head suspension | 2π2200 | rad sec$^{-1}$ |
| $\omega_3$ | resonance: actuator arm carrier | 2π4000 | rad sec$^{-1}$ |
| $\omega_4$ | resonance: coil structure | 2π9000 | rad sec$^{-1}$ |
| $\zeta_1$ | first resonance damping | 0.05 | — |
| $\zeta_2$ | second resonance damping | 0.005 | — |
| $\zeta_3$ | third resonance damping | 0.05 | — |
| $\zeta_4$ | fourth resonance damping | 0.005 | — |

The above table lists the parameters for the disk-drive servo model of this example.

The Optimal Output-Transition (OOT) Solution

Find the relative degree r of the system. The disk-drive servo system Eq. (1) has a relative degree r=3, since the term $CA^2B$=1.54×10$^9$, and the terms CB and CAB are equal to zero.

Choose the transformation matrix to convert the system equations into the output-tracking form. The inverse input that maintains output tracking, i.e., $$\frac{d^3}{dt^3}y(t) = \frac{d^3}{dt^3}y_d(t),$$

is $$u_{inv}(t) := \frac{1}{CA^2B}\left[\frac{d^3}{dt^3}y_d(t) - CA^3x(t)\right], \quad (39)$$

where $y_d(t)$ is the desired output trajectory.

Find the transformation matrix for converting to the output-tracking form. The transformation matrix $T_{\xi\eta}$ is chosen as, $$T_{\xi\eta} := \begin{bmatrix} C \\ CA \\ CA^2 \\ T_\eta \end{bmatrix} = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix} \quad (40)$$

Transform the system into the output tracking form. Multiply the transformation matrix $T_{\xi\eta}$ of Eq. (40) times the state equation of Eq. (1), $$T_{\xi\eta}\frac{d}{dt}x(t) = T_{\xi\eta}Ax(t) + T_{\xi\eta}Bu(t)$$

$$\begin{bmatrix} \frac{d}{dt}\xi(t) \\ \frac{d}{dt}\eta(t) \end{bmatrix} = T_{\xi\eta}AT_{\xi\eta}^{-1}\begin{bmatrix} \xi(t) \\ \eta(t) \end{bmatrix} + T_{\xi\eta}Bu(t).$$

Apply the inverse input to the above transformed state equation:

$$\begin{bmatrix} \frac{d}{dt}\xi(t) \\ \frac{d}{dt}\eta(t) \end{bmatrix} = T_{\xi\eta}AT_{\xi\eta}^{-1}\begin{bmatrix} \xi(t) \\ \eta(t) \end{bmatrix} + T_{\xi\eta}Bu_{inv}(t) \quad (41)$$

$$= T_{\xi\eta}AT_{\xi\eta}^{-1}\begin{bmatrix} \xi(t) \\ \eta(t) \end{bmatrix} + T_{\xi\eta}B\left\{\frac{1}{CA^2B}\left[\frac{d^3}{dt^3}y_d(t) - CA^3x(t)\right]\right\}$$

$$= \left(T_{\xi\eta}AT_{\xi\eta}^{-1} - \frac{T_{\xi\eta}BCA^3T_{\xi\eta}^{-1}}{CA^2B}\right)\begin{bmatrix} \xi(t) \\ \eta(t) \end{bmatrix} + \frac{T_{\xi\eta}B}{CA^2B}\frac{d^3}{dt^3}y_d(t)$$

$$:= \begin{bmatrix} A_{\xi\xi} & 0 \\ A_{\eta\xi} & A_{\eta\eta} \end{bmatrix}\begin{bmatrix} \xi(t) \\ \eta(t) \end{bmatrix} + \begin{bmatrix} 0 \\ B_\eta \end{bmatrix}\frac{d^3}{dt^3}y_d(t),$$

where the matrices $A_{\xi\xi}$, $A_{\eta\xi}$, and $A_{\eta\eta}$ are given by:

$$\left[\begin{array}{c|c} A_{\xi\xi} & 0 \\ \hline A_{\eta\xi} & A_{\eta\eta} \end{array}\right] =$$

$$\begin{bmatrix} 0 & 1 & 0 & 0 & 0 & 0 & \ldots & 0 & 0 & 0 & 0 \\ 0 & 0 & 1 & 0 & 0 & 0 & \ldots & 0 & 0 & 0 & 0 \\ 0 & 0 & 0 & 0 & 0 & 0 & \ldots & 0 & 0 & 0 & 0 \\ 0 & 0.9600 & 0.0765 & -44.1413 & 1759.2861 & -90.5778 & \ldots & -62607.6387 & -5860.7069 & 12119.9516 & -4729.1714 \\ 0 & 0.0000 & 0.0000 & 0.0000 & 0.0000 & 13823.0077 & \ldots & 0.0000 & 0.0000 & 0.0000 & 0.0000 \\ 0 & -0.0001 & 0.0001 & -22.6491 & -13823.8265 & -2984.9614 & \ldots & 6.4468 & -184193.6461 & 13824.2557 & -83001.8639 \\ 0 & 0.0000 & 0.0000 & 0.0000 & 0.0000 & 0.0000 & \ldots & 0.0000 & 25132.7412 & 0.0000 & 0.0000 \\ 0 & -0.0002 & 0.0002 & 41.1801 & 0.3294 & -5175.8752 & \ldots & -25121.0198 & -337410.8125 & 25135.0103 & -150912.4799 \\ 0 & 0.0000 & 0.0000 & 0.0000 & 0.0000 & 0.0000 & \ldots & 0.0000 & 0.0000 & 0.0000 & 56548.6678 \\ 0 & -0.0004 & 0.0004 & 92.6553 & 0.7411 & -11645.7192 & \ldots & 26.3732 & -753519.4614 & 5.1055 & -340118.5664 \end{bmatrix}$$

Rewrite original system Eq. (1) in the output-tracking form, $$\frac{d}{dt}\xi(t) = \frac{d}{dt}\xi_d(t) \quad (42)$$

$$\frac{d}{dt}\eta(t) = A_{\eta\eta}\eta(t) + [A_{\eta\xi} \quad B_\eta]\vec{Y}_d(t)$$

$$:= A_{\eta\eta}\eta(t) + B_\eta\vec{Y}_d(t) \quad (43)$$

where the vector $\vec{Y}_d(t) := \left[\xi_d(t)^T, \frac{d^3}{dt^3}y_d(t)^T\right]^T$ $$= \left[y_d(t)^T, \frac{d}{dt}y_d(t)^T, \frac{d^2}{dt^2}y_d(t)^T, \frac{d^3}{dt^3}y_d(t)^T\right]^T.$$

The matrix $B_\eta$ is given by $$B_\eta = [A_{\eta\xi} \quad B_\eta]$$

$$= \begin{bmatrix} 0 & 0.9600 & 0.0765 & 0.0000 \\ 0 & 0 & 0 & 0 \\ 0 & -0.0001 & 0.0001 & 0.0000 \\ 0 & 0 & 0 & 0 \\ 0 & -0.0002 & 0.0002 & 0.0000 \\ 0 & 0 & 0 & 0 \\ 0 & -0.0004 & 0.0004 & 0.0000 \end{bmatrix}$$

Decouple the Internal Dynamics

Find a decoupled transformation matrix $T_{dc}$. In this example, the matrix $T_{dc}$ is defined by:

$$T_{dc} = \begin{bmatrix} 0.0069 & -1.0000 & 0 & 0.0004 & 0.0000 & 0.0001 & 0.0031 \\ -0.0044 & 0.0003 & 0.0057 & -0.0038 & -0.7039 & -0.0340 & 0.0014 \\ 0.2183 & 0.0002 & 0.0000 & 0.7099 & 0.0000 & 0.0041 & 0.1072 \\ -0.0147 & 0.0003 & 0.0057 & 0.0003 & 0.0172 & -0.1495 & 0.0192 \\ 0.3979 & -0.0001 & 0.0000 & -0.0096 & -0.0001 & 0.0324 & 0.2595 \\ -0.0738 & 0.0003 & 0.0057 & -0.0007 & 0.0127 & 0.7497 & 0.0000 \\ 0.8879 & -0.0000 & 0.0000 & -0.0031 & -0.0002 & 0.0022 & -0.5780 \end{bmatrix}$$

Apply the decoupled transformation matrix $T_{dc}$ to the internal dynamics Eq. (43) as follows, $$T_{dc}^{-1} \frac{d}{dt} \eta(t) = T_{dc}^{-1} A_{\eta\eta} \eta(t) + T_{dc}^{-1} B_{\eta\eta} \vec{Y}_d(t) \tag{44}$$

$$\begin{bmatrix} \frac{d}{dt} \eta_s(t) \\ \frac{d}{dt} \eta_u(t) \end{bmatrix} = T_{dc}^{-1} A_{\eta\eta} T_{dc} \begin{bmatrix} \eta_s(t) \\ \eta_u(t) \end{bmatrix} + T_{dc}^{-1} B_{\eta\eta} \vec{Y}_d(t)$$

$$:= \begin{bmatrix} A_s & 0 \\ 0 & A_u \end{bmatrix} \begin{bmatrix} \eta_s(t) \\ \eta_u(t) \end{bmatrix} + \begin{bmatrix} B_s \\ B_u \end{bmatrix} \vec{Y}_d(t).$$

Note that the matrix $A_{\eta\eta}$ has five eigenvalues with a negative real part, two eigenvalues with a positive real part, and no eigenvalue that has a zero real part. Thus, the internal state $\eta(t)$ for this disk drive model does not contain the center state ($\eta_c$).

The matrices $A_s$, $A_u$, $B_s$, and $B_u$ are given by $$A_s = \begin{bmatrix} -680700.6605 & 0 & 0 & 0 & 0 \\ 0 & -21.99521 & 440.5294 & 0 & 0 \\ 0 & -440.5294 & -21.99521 & 0 & 0 \\ 0 & 0 & 0 & -76.1480 & 13939.5985 \\ 0 & 0 & 0 & -13939.5985 & -76.1480 \end{bmatrix}$$

$$B_s = \begin{bmatrix} 0 & -0.0006 & 0.0005 & 0.0000 \\ 0 & -0.9600 & -0.0765 & -0.0000 \\ 0 & 0.0482 & 0.0060 & 0.0002 \\ 0 & -0.0002 & -0.0000 & 0.0000 \\ 0 & -0.0000 & 0.0000 & 0.0000 \end{bmatrix},$$

$$A_u = \begin{bmatrix} 168.5121 & -43598.1504 \\ 43598.1504 & 168.5121 \end{bmatrix},$$

$$B_u = \begin{bmatrix} 0 & -0.0000 & 0.0000 & 0.0000 \\ 0 & -0.0002 & -0.0000 & -0.0000 \end{bmatrix}$$

Compute the transformation matrix T that transforms the original system into the decoupled output-tracking form, $$T := \begin{bmatrix} I_{3 \times 3} & 0 \\ 0 & T_{dc}^{-1} \end{bmatrix} T_{\xi\eta} = \tag{45}$$

$$\begin{bmatrix} 1 & 0 & 0 & 0 & 0 & 0 & \ldots & 0 & 0 & 0 & 0 \\ 0 & 10000 & 0 & 0 & 0 & 0 & \ldots & 0 & 0 & 0 & 0 \\ 0 & -125500 & -5750 & 11.5000 & 23000 & 0 & \ldots & 818500 & 0 & 164200 & 27300 \\ 0 & 0 & 0 & -0.0002 & 0.0004 & 0.0191 & \ldots & -0.0459 & -1.2411 & 0.0462 & -0.5623 \\ 0 & 0 & 0 & -1.0000 & -0.0000 & 0.0007 & \ldots & -0.0004 & -0.0142 & 0.0004 & -0.0012 \\ 0 & 0 & 0 & 0.0522 & 3.9938 & -0.0000 & \ldots & 142.9389 & 0.0007 & 28.6750 & 4.7676 \\ 0 & 0 & 0 & -0.0002 & 0.0002 & 1.3995 & \ldots & 0.0175 & 0.6708 & -0.0179 & 0.0423 \\ 0 & 0 & 0 & 0.0000 & -1.3878 & -0.0079 & \ldots & -1.2101 & 0.0061 & -0.1787 & -0.0326 \\ 0 & 0 & 0 & -0.0000 & -0.0069 & 0.0033 & \ldots & -1.1013 & 0.1216 & 1.1085 & 0.0185 \\ 0 & 0 & 0 & -0.0002 & 0.0010 & 0.0218 & \ldots & 0.0659 & 1.9105 & -0.0668 & -0.8661 \end{bmatrix}$$

The transformation matrix T decouples the state into the following coordinates:

$$x(t) = T^{-1} [\xi(t)^T \quad \eta_s(t)^T \quad \eta_u(t)^T]^T \tag{46}$$

$$:= [\Phi_\xi \quad \Phi_{\eta_s} \quad \Phi_{\eta_u}] [\xi(t)^T \quad \eta_s(t)^T \quad \eta_u(t)^T]^T$$

where the matrices $\Phi_\xi$, $\Phi_{\eta_s}$, and $\Phi_{\eta_u}$ are the components of the matrix $T^{-1}$ corresponding to each variable $\xi(t)$, $\eta_s(t)$, and $\eta_u(t)$, respectively.

Rewrite the inverse control law in terms of the decoupled internal states and the known output component $Y_d(t)$ (using the decoupled transformation T in Eq. (45)) as $$u_{inv}(t) = \frac{1}{CA^2B} \frac{d^3}{dt^3} y_d(t) - \frac{CA^3T^{-1}}{CA^2B} \begin{bmatrix} \xi_d(t) \\ \eta_s(t) \\ \eta_u(t) \end{bmatrix} \quad (47)$$

$$:= \frac{1}{CA^2B} \frac{d^3}{dt^3} y_d(t) + U_\xi \xi(t) + U_s \eta_s(t) + U_u \eta_u(t)$$

$$= U_s \eta_s(t) + U_u \eta_u(t) + \begin{bmatrix} U_\xi & \frac{1}{CA^2B} \end{bmatrix} \begin{bmatrix} \xi_d(t) (42) \\ \frac{d^3}{dt^3} y_d(t) \end{bmatrix}$$

$$:= U_s \eta_s(t) + U_u \eta_u(t) + U_y \vec{Y}_d(t),$$

$H_1 := [\Phi_\xi | \Phi_{\eta_u} | -\Gamma_\xi | -\Gamma_{\eta_s}]$ $$= \begin{bmatrix}
1.0000 & 0 & 0 & 0 & 0 & -1.0000 & -0.0049 & \ldots & -0.0000 & 0.0767 & -0.0362 & 0.0471 & -0.0042 & -0.0002 \\
0 & 0.0001 & -0.0000 & 0.0000 & 0.0000 & 0 & -0.0001 & \ldots & -0.0000 & -0.0014 & -0.0018 & 0.0011 & 0.0000 & -0.0000 \\
0 & -0.0022 & -0.0002 & -0.0000 & 0.0000 & 0 & -0.0011 & \ldots & -0.0001 & -0.0051 & 0.7516 & 0.4890 & -0.0003 & -0.0000 \\
0 & 0 & 0 & 0.0001 & 0.0031 & 0 & -0.0016 & \ldots & -0.0001 & 0.0039 & -0.5243 & 0.7283 & 0.0002 & 0.0000 \\
0 & 0 & 0 & -0.0340 & 0.0014 & 0 & 0 & \ldots & 0 & 0.0033 & -0.0002 & -0.0041 & 0.0032 & 0.4982 \\
0 & 0 & 0 & 0.0041 & 0.1072 & 0 & 0 & \ldots & 0 & -0.1545 & 0.0001 & -0.0000 & -0.5025 & 0.0004 \\
0 & 0 & 0 & -0.1495 & 0.0192 & 0 & 0 & \ldots & 0 & 0.0001 & -0.0000 & -0.0000 & -0.0000 & -0.0000 \\
0 & 0 & 0 & 0.0324 & 0.2595 & 0 & 0 & \ldots & 0 & -0.0007 & 0.0000 & -0.0000 & 0.0000 & 0.0000 \\
0 & 0 & 0 & 0.7497 & 0.0000 & 0 & 0 & \ldots & 0 & 0.0187 & -0.0001 & -0.0014 & 0.0002 & -0.0031 \\
0 & 0 & 0 & 0.0022 & -0.5780 & 0 & 0 & \ldots & 0 & -0.2159 & 0.0000 & -0.0000 & 0.0008 & 0.0000
\end{bmatrix}$$

$H_2 := [\Phi_{\eta_s} | -\Gamma_\xi]$ $$= \begin{bmatrix}
0 & 0 & 0 & 0 & 0 & -0.0010 & -0.0339 \\
-0.0000 & 0.0000 & 0.0000 & -0.0000 & -0.0000 & -0.0000 & -0.0007 \\
-0.0000 & 0.0503 & 1.0016 & 0.0000 & -0.0000 & -0.0001 & -0.0022 \\
0.0069 & -1.0000 & 0.0000 & 0.0004 & 0.0000 & 0.0000 & 0.0017 \\
-0.0044 & 0.0003 & 0.0057 & -0.0038 & -0.7039 & 0.0240 & -0.0010 \\
0.2183 & -0.0002 & 0.0000 & 0.7099 & 0.0000 & -0.0029 & -0.0759 \\
-0.0147 & 0.0003 & 0.0057 & 0.0003 & 0.0172 & 0.0003 & 0.0000 \\
0.3979 & -0.0001 & 0.0000 & -0.0096 & 0.0001 & -0.0000 & -0.0005 \\
-0.0738 & 0.0003 & 0.0057 & -0.0007 & 0.0127 & -0.1824 & -0.0005 \\
0.8879 & -0.0000 & 0.0000 & -0.0031 & -0.0002 & -0.0012 & 0.1406
\end{bmatrix}$$

where the components $U_s$, $U_u$, and $U_y$ are given by:

$U_s = [-10.7523\ 0.0003\ 0.0057\ -0.0007\ 0.0119]$ $U_u = [0.3041\ -0.0092]$ $U_y = [0\ -0.7151\ 0.7560\ 0.0648] \times 10^{-8}$.

Compute the Following Parameters

Compute matrices $W_{pre}$ and $W_{post}$ by solving the Lyapunov equations $W_{pre} A_u + A_u^T W_{pre} = U_u^T U_u$, and $W_{post} A_s + A_s^T W_{post} = -U_s^T U_s$.

which results in $$W_{pre} = \begin{bmatrix} 0.1374 & 0.0005 \\ 0.0005 & 0.1374 \end{bmatrix} \times 10^{-3}, \text{ and}$$

$$W_{post} = \begin{bmatrix}
0.8492 & 0.0000 & 0.0009 & 0.0001 & -0.0019 \\
0.0000 & 0.0037 & -0.0002 & 0.0000 & -0.0000 \\
0.0009 & -0.0002 & 0.0037 & 0.0000 & 0.0000 \\
0.0001 & 0.0000 & 0.0000 & 0.0047 & -0.0000 \\
-0.0019 & -0.0000 & 0.0000 & -0.0000 & 0.0047
\end{bmatrix} \times 10^{-4}.$$

Compute the matrices $H_1$ and $H_2$:

where the components $[\Gamma_\xi | \Gamma_{\eta_s} | \Gamma_{\eta_u}] := e^{A(t_f - t_i)} T^{-1}$.

Compute the constrained components of the boundary states $$\hat{f} := [\bar{\xi}^T\ \bar{\eta}_u^T\ \bar{\eta}_c^T\ \xi^T\ \eta_s^T\ \eta_c^T]^T$$

$$= [1\ 0\ 0\ 0\ 0\ 0\ 0\ 0\ 0\ 0\ 0\ 0]^T.$$

where $[\xi^T \eta_s^T \eta_u^T \eta_c^T]^T = x^T T^T$, and $[\bar{\xi}^T \bar{\eta}_s^T \bar{\eta}_u^T \bar{\eta}_c^T]^T = \bar{x}^T T^T$.

Compute the controllability grammian. In this simulation, the controllability grammian is computed using Simpson's rule for numerical integration.

$$G_{(t_i,t_f)} := \int_{t_i}^{t_f} e^{A(t_f-\tau)} BB^T e^{A^T(t_f-\tau)} d\tau$$

$$= \begin{bmatrix} 39971.5562 & 1178.2116 & 4349.8963 & 264.6929 & -3483.5318 & -53.1045 & -169.0146 & -25.4815 & -1315.8228 & -19.2036 \\ 1178.2116 & 48.7268 & 146.6033 & 72.7196 & 69.3019 & -66.5081 & 60.4713 & -408.5038 & 94.8063 & -773.8534 \\ 4349.8963 & 143.6033 & 512.1978 & 116.2719 & -226.3305 & -19.7685 & 0.2002 & -7.7994 & -77.6393 & -4.0528 \\ 264.6929 & 72.7196 & 116.2719 & 344.4303 & 615.1481 & -5.0933 & 440.3320 & 0.8463 & 499.7838 & -0.0941 \\ -3483.5318 & 69.3019 & -226.3305 & 615.1481 & 344887.4335 & 0.0436 & 1631.6319 & -10802.1127 & 33.4811 & -2971.4024 \\ -53.1045 & -66.5081 & -19.7685 & -5.0933 & 0.0436 & 344881.4842 & 19640.2124 & 1002.5561 & 12174.3012 & 37.4577 \\ -169.0146 & 60.4713 & 0.2002 & 440.3320 & 1631.6319 & 19640.2124 & 125663.2746 & 0.0011 & 942.4108 & -13858.9251 \\ -25.4815 & -408.5038 & -7.7994 & 0.8463 & -10802.1127 & 1002.5561 & 0.0011 & 125663.2611 & 31182.6810 & 1804.8094 \\ -1315.8228 & 94.8063 & -77.6393 & 499.7898 & 33.4811 & 12174.3012 & 942.4108 & 31182.6810 & 2660028.8471 & 10.2140 \\ -19.2036 & -773.8534 & -4.0528 & -0.0941 & -2971.4024 & 37.4577 & -13858.9251 & 1804.8094 & 10.2140 & 2660270.3979 \end{bmatrix}$$

Compute the total cost components:

$$\Lambda := \begin{bmatrix} W_{post} & 0 \\ 0 & W_{pre} \end{bmatrix} + H_2^T G_{(t_i,t_f)}^{-1} H_2$$

$$= \begin{bmatrix} 0.0001 & 0.0006 & 0.0001 & 0.0000 & -0.0000 & 0.0000 & 0.0000 \\ 0.0007 & 1.0771 & 0.3920 & 0.0000 & 0.0001 & -0.0000 & -0.0002 \\ 0.0001 & 0.3920 & 0.1915 & 0.0000 & 0.0000 & 0.0000 & 0.0001 \\ 0.0000 & 0.0000 & 0.0000 & 0.0000 & 0.0000 & -0.0000 & -0.0000 \\ -0.0000 & 0.0001 & 0.0000 & 0.0000 & 0.0000 & -0.0000 & 0.0000 \\ 0.0000 & -0.0000 & -0.0000 & -0.0000 & -0.0000 & 0.0001 & 0.0000 \\ 0.0000 & 0.0002 & 0.0001 & -0.0000 & 0.0000 & 0.0000 & 0.0001 \end{bmatrix}$$

$$b := \begin{bmatrix} W_{post} & \bar{\eta}_s \\ W_{pre} & \underline{\eta}_u \end{bmatrix} - H_2^T G_{(t_i,t_f)}^{-1} H_1 \hat{f}$$

$$= [0.0001 \; 0.1840 \; 0.0701 \; 0.0000 \; 0.0000 \; -0.0000 \; 0.0000]^T$$

$$c := \bar{\eta}_s^T W_{post} \bar{\eta}_s + \underline{\eta}_u^T W_{pre} \underline{\eta}_u + \hat{f}^T H_1^T G_{(t_i,t_f)}^{-1} H_1 \hat{f}$$

$$= 0.0317$$

Compute the optimal boundary condition:

$$\Psi^* = \begin{bmatrix} \eta_s^* \\ \eta_u^* \end{bmatrix} = \Lambda^{-1} b$$

$$= [0.0444 \; 0.1472 \; 0.0649 \; 0.1375 \; 0.4304 \; 0.0004 \; 0.0122]^T$$

Compute the Optimal Output-transition Solution

Compute the optimal control input $$u_{oot}^*(t) = \begin{cases} U_u e^{A_u(t-t_i)}[\eta_u^* - \underline{\eta}_u] & \text{if } t < t_i \\ B^T e^{A^T(t_f-t)} G_{(t_i,t_f)}^{-1}[x^*(t_f) - e^{A(t_f-t_i)} x^*(t_i)] & \text{if } t_i \leq t \leq t_f \\ U_s e^{A_s(t-t_f)}[\eta_s^* - \bar{\eta}_s] & \text{if } t > t_f \end{cases} \quad (48)$$

where the optimal boundary states are given by:

$$x^*(t_i) = T^{-1}[\underline{\xi}^T \; \underline{\eta}_s^T \; \eta_u^{*T} \; \eta_c^{*T}]^T$$

$$= [1 \; -0.0000 \; 0.0724 \; -0.1468 \; -0.3033 \; 0.1073 \; 0.0072 \; 0.0164 \; 0.0025 \; 0.0389]^T$$

$$x^*(t_f) = T^{-1}[\bar{\xi}^T \; \eta_s^{*T} \; \bar{\eta}_u^T \; \bar{\eta}_c^T]^T$$

$$= [0 \; 0.0000 \; 0.0000 \; 0.0000 \; 0.0000 \; 0.0013 \; 0.0002 \; 0.0032 \; 0.0003 \; -0.0071]^T$$

Compute the optimal output-transition cost:

$$J^*_{oot} = \Psi^{*T}\Lambda\Psi^* - 2\Psi^{*T}b + c$$
$$= 9.5091 \times 10^{-5}$$

Figure 6:
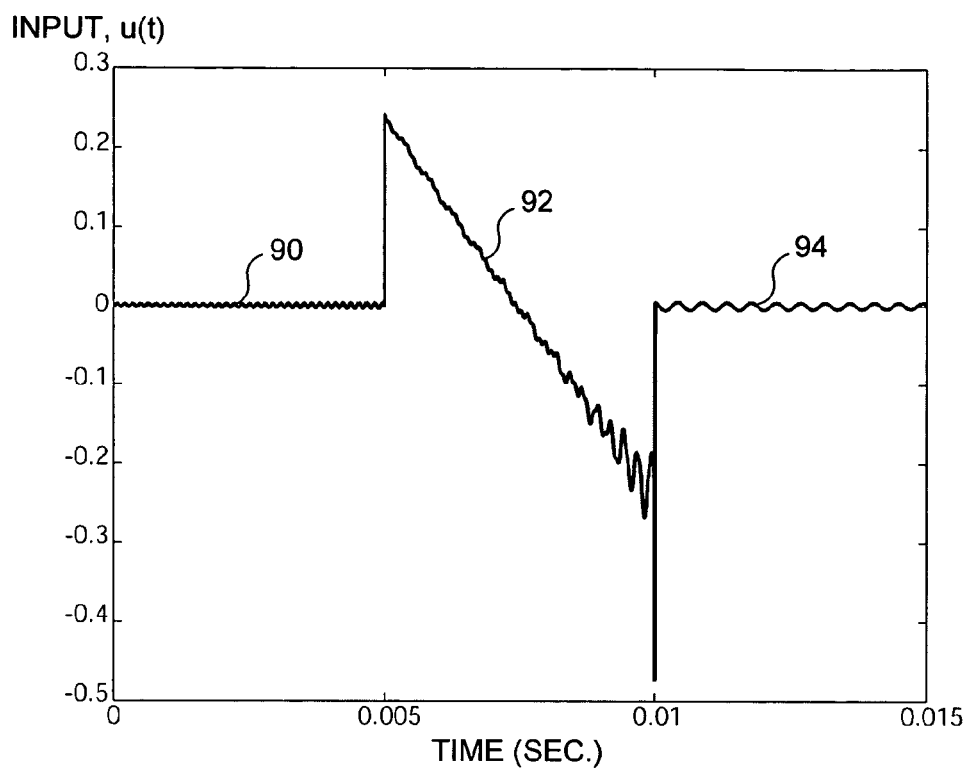
FIG. 6 is a graph showing a continuous input signal applied to the motor used to position the read/write head, where the continuous input signal is determined in accord with the present invention using an optimal output-transition approach, $u_{oot}(t)$.
Figure 7:
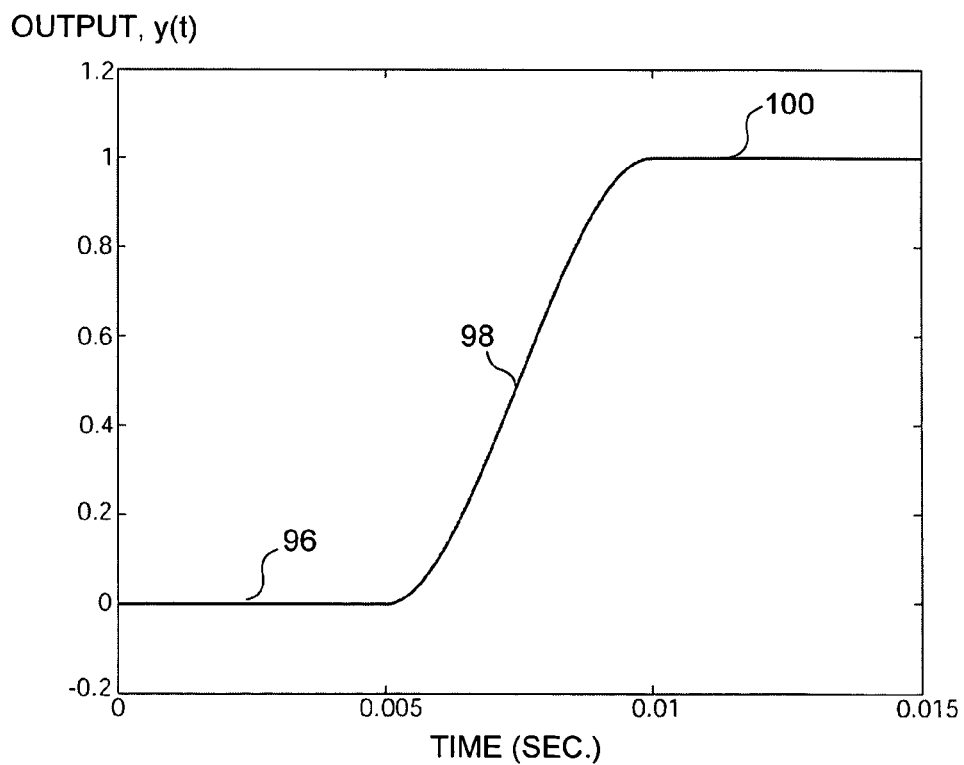
FIG. 7 is a graph showing the output position of the read/write head as a function of time (optimal output trajectory, $y_{oot}(t)$) in response to the continuous input signal of FIG. 6.

Simulation results: The input signal or optimal output-transition input, $u_{oot}(t)$, that is applied to the motor to position the read/write head is shown in FIG. 6, and the resulting output trajectory of the read/write head when the optimal input signal is applied is shown in FIG. 7. As indicated in FIG. 6, a continuous pre-actuation input signal 90 is applied to move the read/write head prior to a transition-time interval. In this example, the transition-time interval begins at 0.005 sec. and ends at 0.01 sec. During the transition-time interval, a continuous input signal 92 is applied to move the read/write head. After the transition-time interval, a continuous post-actuation input signal 94 is applied. A horizontal line 96 in FIG. 7 illustrates that prior to the transition-time interval, the read/write head does not move from a first position. During the transition-time interval, the read/write head moves to a second position, following a trajectory 98. As indicated by a horizontal line 100, the read/write head is also stable at the second position and does not move after the end of the transition-time interval. Thus, it will be apparent that the read/write head has been efficiently moved between the two positions, while achieving the desired optimization criterion.

Exemplary Application of the Present Invention for Controlling a Disk Drive Servo Using a Discrete Input System Again, the disk-drive model employed in this example consists of one rigid-body mode and four flexible modes at the frequencies of 70 Hz, 2200 Hz, 4000 Hz, and 9000 Hz. The discrete-time dynamics of the model are described in a linear state-space form as:

$$\begin{cases} x(k+1) = Ax(k) + Bu(k) \\ y(k) = Cx(k) \end{cases} \quad (49)$$

where the matrices A, B, and C, are given by:

$$A = \begin{bmatrix} 1 & 0.6597 & -0.0000 & 0 & 0.0000 & 0.0000 & 0.0014 & 0.0008 & 0.0001 & 0.0002 \\ 0 & 0.9992 & -0.0000 & 0 & 0.0001 & 0.0001 & 0.0033 & 0.0034 & -0.0002 & 0.0005 \\ 0 & 0 & 0.9996 & 0.0290 & 0 & 0 & 0 & 0 & 0 & 0 \\ 0 & 0 & -0.0290 & 0.9967 & 0 & 0 & 0 & 0 & 0 & 0 \\ 0 & 0 & 0 & 0 & 0.6131 & 0.7873 & 0 & 0 & 0 & 0 \\ 0 & 0 & 0 & 0 & -0.7873 & 0.6052 & 0 & 0 & 0 & 0 \\ 0 & 0 & 0 & 0 & 0 & 0 & -0.0330 & 0.9182 & 0 & 0 \\ 0 & 0 & 0 & 0 & 0 & 0 & -0.9182 & -0.1249 & 0 & 0; \\ 0 & 0 & 0 & 0 & 0 & 0 & 0 & 0 & -0.8180 & -0.5465 \\ 0 & 0 & 0 & 0 & 0 & 0 & 0 & 0 & 0.5465 & -0.8125 \end{bmatrix},$$

B=[0.0007 0.0034 0.0004 0.0290 0.3869 0.7873 1.0330 0.9182 1.8180 −0.5465]$^T$, and C=[1 0 0 0 0 0 0 0 0 0]

The goal of the optimal output-transition control in this example is to move the position of the end-point (denoted by the output y) of the read/write head by one unit within the prescribed output-transition time (i.e., seek time) of 5 msec while using a minimum control energy. During simulations of this model, the output transition starts at a time $t_i$=5 msec and ends at a time $t_f$=10 msec, and the desired equilibrium states are chosen to be:

x̲=[0 0 0 0 0 0 0 0 0 0], and x̄=[1 0 0 0 0 0 0 0 0 0].

The Optimal Output-transition (OOT) Solution

Find the relative degree r of the system. The discrete-time disk-drive servo model Eq. (49) has a relative degree r=1, since the term CB=6.632×10$^{-4}$.

Choose the transformation matrix to convert the system equations into the output-tracking form. The inverse input that maintains output tracking, i.e., y(k+1)=$y_d$(k+1), is:

$$u_{inv}(k) := \frac{1}{CB}[y_d(k+1) - CAx(k)], \quad (50)$$

where $y_d$(k) is the desired output trajectory.

Find the transformation matrix for converting to the output-tracking form. The transformation matrix $T_{\xi\eta}$ is chosen as:

$$T_{\xi\eta} := \begin{bmatrix} C \\ T_\eta \end{bmatrix} = \begin{bmatrix} C \\ 0 & 1 & 0 & 0 & 0 & 0 & 0 & 0 & 0 & 0 \\ 0 & 0 & 1 & 0 & 0 & 0 & 0 & 0 & 0 & 0 \\ 0 & 0 & 0 & 1 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{bmatrix} \quad (51)$$

Transform the system into the output tracking form. Multiply the transformation matrix $T_{\xi\eta}$ Eq. (51) with the state equation Eq. (49):

$$T_{\xi\eta}x(k+1) = T_{\xi\eta}Ax(k) + T_{\xi\eta}Bu(k)$$

$$\begin{bmatrix} \xi(k) \\ \eta(k) \end{bmatrix} = T_{\xi\eta}AT_{\xi\eta}^{-1}\begin{bmatrix} \xi(k) \\ \eta(k) \end{bmatrix} + T_{\xi\eta}Bu(k)$$

Apply the inverse input to the above transformed state equation, $$\begin{bmatrix} \xi(k+1) \\ \eta(k+1) \end{bmatrix} = T_{\xi\eta}AT_{\xi\eta}^{-1}\begin{bmatrix} \xi(k) \\ \eta(k) \end{bmatrix} + T_{\xi\eta}Bu_{inv}(k) \qquad (52)$$

$$= T_{\xi\eta}AT_{\xi\eta}^{-1}\begin{bmatrix} \xi(k) \\ \eta(k) \end{bmatrix} + T_{\xi\eta}B\left\{\frac{1}{CB}[y_d(k+1) - CAx(k)]\right\}$$

$$= \left(T_{\xi\eta}AT_{\xi\eta}^{-1} - \frac{T_{\xi\eta}BCAT_{\xi\eta}^{-1}}{CB}\right)\begin{bmatrix} \xi(k) \\ \eta(k) \end{bmatrix} + \frac{T_{\xi\eta}B}{CB}y_d(k+1)$$

$$:= \begin{bmatrix} A_{\xi\xi} & 0 \\ A_{\eta\xi} & A_{\eta\eta} \end{bmatrix}\begin{bmatrix} \xi(k) \\ \eta(k) \end{bmatrix} + \begin{bmatrix} B_\xi \\ B_\eta \end{bmatrix}y_d(k+1),$$

where the matrices $A_{\xi\xi}$, $A_{\eta\xi}$, $A_{\eta\eta}$, and $B_\eta$ are given by:

$$\left[\begin{array}{c|c} A_{\xi\xi} & 0 \\ \hline A_{\eta\xi} & A_{\eta\eta} \end{array}\right] = \begin{bmatrix} 0 & 0 & 0 & 0 & 0 & 0 & \cdots & 0 & 0 & 0 & 0 \\ -5.1564 & -2.4026 & 0.0000 & 0 & -0.0001 & -0.0000 & \cdots & -0.0040 & -0.0009 & -0.0005 & -0.0007 \\ -0.6346 & -0.4187 & 0.9996 & 0.0290 & -0.0000 & -0.0000 & \cdots & -0.0009 & -0.0005 & -0.0000 & -0.0001 \\ -43.7006 & -28.8304 & -0.0284 & 0.9967 & -0.0020 & -0.0006 & \cdots & -0.0621 & -0.0361 & -0.0026 & -0.0102 \\ -583.4237 & -384.9002 & 0.0073 & 0 & 0.5858 & 0.7788 & \cdots & -0.8289 & -0.4817 & -0.0345 & -0.1367 \\ -1187.1678 & -783.2063 & 0.0149 & 0 & -0.8428 & 0.5879 & \cdots & -1.6867 & -0.9802 & -0.0702 & -0.2781 \\ -1557.6761 & -1027.6406 & 0.0195 & 0 & -0.0728 & -0.0227 & \cdots & -2.2462 & -0.3679 & -0.0921 & -0.3649 \\ -1384.4479 & -913.3573 & 0.0173 & 0 & -0.0647 & -0.0202 & \cdots & -2.8852 & -1.2679 & -0.0819 & -0.3243 \\ -2741.2580 & -1808.4812 & 0.0343 & 0 & -0.1280 & -0.0400 & \cdots & -3.8947 & -2.2633 & -0.9801 & -1.1886 \\ 824.1106 & 543.6878 & -0.0103 & 0 & 0.0385 & 0.0120 & \cdots & 1.1709 & 0.6804 & 0.5953 & -0.6195 \end{bmatrix},$$

$$\begin{bmatrix} B_\xi \\ B_\eta \end{bmatrix} = \begin{bmatrix} 1 \\ 5.1564 \\ 0.6346 \\ 43.7006 \\ 583.4237 \\ 1187.1678 \\ 1557.6761 \\ 1384.4479 \\ 2741.2580 \\ -824.1106 \end{bmatrix}$$

Rewrite the original system of Eq. (49) in the output-tracking form, $$\xi(k+1) = \xi_d(k+1) \qquad (53)$$

$$\eta(k+1) = A_{\eta\eta}\eta(k) + [A_{\eta\xi} \quad B_\eta]\vec{Y}_d(k)$$

$$:= A_{\eta\eta}\eta(k) + B_{\eta\eta}\vec{Y}_d(k) \qquad (54)$$

where the vector $\vec{Y}_d(k) := [\xi_d(k)^T, y_d(k+r)]^T = [y_d(k), y_d(k+1)]^T$.

Decouple the internal dynamics. Find a decoupled transformation matrix $T_{dc}$. In this example, the matrix $T_{dc}$ is chosen by:

$$T_{dc} = \begin{bmatrix} 0.0000 & 0.0003 & 0.0007 & 0.0000 & -0.0000 & 0.0000 & -0.0000 & -0.0007 & 0.0002 \\ -0.0000 & 0.0000 & -0.0001 & -0.0000 & 0.0000 & -0.7081 & 0 & -0.0001 & 0.0000 \\ -0.0002 & -0.0018 & 0.0088 & -0.0004 & -0.0000 & 0.0354 & -0.7052 & -0.0088 & 0.0042 \\ -0.0120 & 0.0023 & -0.0944 & 0.0039 & 0.7035 & -0.0041 & 0.0001 & -0.0871 & 0.0016 \\ -0.0084 & -0.0627 & 0.2659 & -0.7103 & 0 & 0.0000 & -0.0001 & -0.2669 & 0.1409 \\ -0.0711 & 0.0035 & -0.3360 & -0.0003 & -0.0174 & -0.0041 & 0.0001 & -0.3026 & 0.0176 \\ -0.0114 & -0.1654 & 0.4431 & 0.0079 & -0.0002 & 0.0000 & -0.0001 & -0.3996 & 0.3109 \\ 0.7766 & 0 & -0.7191 & 0.0007 & -0.0141 & -0.0040 & 0.0001 & -0.7462 & 0.1014 \\ 0.0169 & -0.5999 & -0.3067 & -0.0021 & -0.0001 & -0.0000 & 0.0000 & 0.3363 & -0.9343 \end{bmatrix}$$

Apply the decoupled transformation matrix $T_{dc}$ to the internal dynamics Eq. (54) as follows:

$$T_{dc}^{-1}\eta(k+1) = T_{dc}^{-1}A_{\eta\eta}\eta(k) + T_{dc}^{-1}B_{\eta\eta}Y_d(k) \quad (55)$$

$$\begin{bmatrix} \eta_s(k+1) \\ \eta_u(k+1) \end{bmatrix} = T_{dc}^{-1}A_{\eta\eta}T_{dc}\begin{bmatrix} \eta_s(k) \\ \eta_u(k) \end{bmatrix} + T_{dc}^{-1}B_{\eta\eta}Y_d(k)$$

$$:= \begin{bmatrix} A_s & 0 \\ 0 & A_u \end{bmatrix}\begin{bmatrix} \eta_s(k) \\ \eta_u(k) \end{bmatrix} + \begin{bmatrix} B_s \\ B_u \end{bmatrix}Y_d(k).$$

The matrix $A_{\eta\eta}$ has seven eigenvalues with a magnitude less than 1, two eigenvalues with a magnitude greater than 1, and no eigenvalue having a magnitude equal to 1. Thus, the internal state $\eta(k)$ for this disk drive model does not contain the center state ($\eta_c$).

Compute the transformation matrix T that transforms the original system into the decoupled output-tracking form:

$$T := \begin{bmatrix} I_{1\times 1} & 0 \\ 0 & T_{dc}^{-1} \end{bmatrix} T_{\xi\eta}. \quad (56)$$

The transformation matrix T decouples the state into the following coordinates:

$$x(t) = T^{-1}[\xi(k)^T \quad \eta_s(k)^T \quad \eta_u(k)^T]^T \quad (57)$$

$$:= [\Phi_\xi \quad \Phi_{\eta_s} \quad \Phi_{\eta_u}][\xi(k)^T \quad \eta_s(k)^T \quad \eta_u(k)^T]^T$$

where the matrices $\Phi_\xi$, $\Phi_{\eta_s}$, and $\Phi_{\eta_u}$ are the components of the matrix $T^{-1}$ corresponding to each variable $\xi(k)$, $\eta_s(k)$, and $\eta_u(k)$, respectively.

Rewrite the inverse control law in terms of the decoupled internal states and the known output component $\vec{Y}_d(k)$ (using the decoupled transformation T in Eq. (56)) as $$u_{inv}(k) = \frac{1}{CB}y_d(k+1) - \frac{CAT^{-1}}{CB}\begin{bmatrix} \xi_d(k) \\ \eta_s(k) \\ \eta_u(k) \\ \eta_c(k) \end{bmatrix} \quad (58)$$

$$:= \frac{1}{CB}y_d(k+1) + U_\xi\xi(k) + U_s\eta_s(k) + U_u\eta_u(k) + U_c\eta_c(k)$$

$$= U_s\eta_s(k) + U_u\eta_u(k) + U_c\eta_c(k) + \begin{bmatrix} U_\xi & \frac{1}{CB} \end{bmatrix}\begin{bmatrix} \xi_d(t) \\ y_d(k+1) \end{bmatrix}$$

$$:= U_s\eta_s(k) + U_u\eta_u(k) + U_c\eta_c(k) + U_y\vec{Y}_d(k)$$

where the components $U_s$, $U_u$, and $U_y$ are given by $U_s = [0.0541 \; 0.0996 \; -0.3527 \; 0.0061 \; -0.0107 \; -0.0040 \; -0.0000]$ $U_u = [1.7923 \; -0.2935]$ $U_y = [-1.5078 \; 1.5078] \times 10^3$.

Compute the Following Parameters

Compute matrices $W_{pre}$ and $W_{post}$ by solving the discrete-time algebraic Lyapunov equations:

$(A_u^{-1})^T W_{pre} A_u^{-1} - W_{pre} + (A_u^{-1})^T U_u^T U_u A_u^{-1} = 0$, and $A_s^T W_{post} A_s - W_{post} + U_s^T U_s = 0$.

Compute the matrices $H_1$ and $H_2$:

$[\Gamma_\xi | \Gamma_{\eta_s} | \Gamma_{\eta_u}] := A^{k_f - k_i - r + 1} T^{-1}$ $H_1 := [\Phi_\xi | \Phi_{\eta_u}| -\Gamma_\xi | -\Gamma_{\eta_s}]$ $H_2 := [\Phi_{\eta_s} | -\Gamma_{\eta_u}]$.

Compute the constrained components of the boundary states:

$$\hat{f} := [\underline{\xi}^T \; \underline{\eta}_u^T \; \underline{\eta}_c^T \; \overline{\xi}^T \; \overline{\eta}_s^T \; \overline{\eta}_c^T]^T$$

$$= [1 \; 0 \; 0 \; 0 \; 0 \; 0 \; 0 \; 0 \; 0 \; 0 \; 0 \; 0]^T$$

where $[\underline{\xi}^T \underline{\eta}_s^T \underline{\eta}_u^T \underline{\eta}_c^T]^T = \underline{x}^T T^T$, and $[\overline{\xi}^T \overline{\eta}_s^T \overline{\eta}_u^T \overline{\eta}_c^T]^T = \overline{x}^T T^T$.

Compute the controllability grammian. In this simulation, the controllability grammian is computed by using Simpson's rule for numerical integration:

$$G_{(k_i,k_f)} := \sum_{k=k_i-r+1}^{k_f-1} A^{k_f-k-1} BB^T (A^T)^{k_f-k-1}$$

$$= \begin{bmatrix} 2.5612 & 0.0763 & 0.2820 & 0.0214 & -0.1776 & -0.1476 & -0.0084 & -0.0021 & 0.0723 & -0.0245 \\ 0.0763 & 0.0032 & 0.0094 & 0.0049 & 0.0049 & -0.0068 & 0.0034 & -0.0212 & 0.0026 & -0.0136 \\ 0.2820 & 0.0094 & 0.0335 & 0.0079 & -0.0115 & -0.0108 & 0.0000 & -0.0004 & 0.0050 & -0.0015 \\ 0.0214 & 0.0049 & 0.0079 & 0.0225 & 0.0380 & 0.0070 & 0.0290 & 0.0001 & 0.0253 & 0.0012 \\ -0.1776 & 0.0049 & -0.0115 & 0.0380 & 21.2001 & 0.1169 & 0.1001 & -0.5463 & -0.0945 & 0.2033 \\ -0.1476 & -0.0068 & -0.0108 & 0.0070 & 0.1169 & 20.9566 & 1.2197 & 0.0580 & 1.1389 & -0.0296 \\ -0.0084 & 0.0034 & 0.0000 & 0.0290 & 0.1001 & 1.2197 & 6.5662 & 0.2170 & 0.1589 & 0.7983 \\ -0.0021 & -0.0212 & -0.0004 & 0.0001 & -0.5463 & 0.0580 & 0.2170 & 6.5300 & 2.4263 & -0.1694 \\ 0.0723 & 0.0026 & 0.0050 & 0.0253 & -0.0945 & 1.1389 & 0.1589 & 2.4263 & 46.1930 & -1.7887 \\ -0.0245 & -0.0136 & -0.0015 & 0.0012 & 0.2033 & -0.0296 & 0.7983 & -0.1694 & -1.7887 & 45.9564 \end{bmatrix}$$

Compute the total cost components:

$$\Lambda := \begin{bmatrix} W_{post} & 0 \\ 0 & W_{pre} \end{bmatrix} + H_2^T G_{(t_i,t_f)}^{-1} H_2$$

$$= \begin{bmatrix} 0.0998 & 0.0055 & -0.0394 & 0.0003 & -0.0006 & 0.0141 & -0.2287 & -0.0026 & -0.0010 \\ 0.0055 & 0.0968 & -0.0521 & 0.0024 & -0.0007 & 0.4983 & -1.8897 & -0.0016 & 0.0028 \\ -0.0394 & -0.0521 & 0.2339 & -0.0141 & 0.0001 & -3.2064 & 11.7127 & -0.0005 & 0.0036 \\ 0.0003 & 0.0024 & -0.0141 & 0.0321 & 0.0002 & -0.0909 & -0.1716 & -0.0072 & 0.0030 \\ -0.0006 & -0.0007 & 0.0001 & 0.0002 & 0.0315 & 0.6124 & -1.5111 & -0.0006 & 0.0013 \\ 0.0141 & 0.4983 & -3.2064 & -0.0909 & 0.6124 & 1957.4165 & -3594.9956 & 5.1638 & -2.3374 \\ -0.2287 & -1.8897 & 11.7127 & -0.1716 & -1.5111 & -3594.9956 & 8339.7962 & -7.9194 & 3.5656 \\ -0.0026 & -0.0016 & -0.0005 & -0.0072 & -0.0006 & 5.1638 & -7.9194 & 0.1601 & -0.1372 \\ -0.0010 & 0.0028 & 0.0036 & 0.0030 & 0.0013 & -2.3374 & 3.5656 & -0.1372 & 0.9741 \end{bmatrix}$$

$$b := \begin{bmatrix} W_{post} \, \overline{\eta}_s \\ W_{pre} \, \underline{\eta}_u \end{bmatrix} - H_2^T G_{(t_i,t_f)}^{-1} H_1 \hat{f}$$

$$= [-0.0501 \ -0.4517 \ 2.8084 \ -0.0267 \ -0.3834 \ -935.3361 \ \ldots \ 2071.0618 \ -2.2227 \ 1.0035]^T.$$

$$c := \overline{\eta}_s^T W_{post} \overline{\eta}_s + \underline{\eta}_u^T W_{pre} \underline{\eta}_u + \hat{f}^T H_t^T G_{(t_i,t_f)}^{-1} H_1 \hat{f}$$

$$= 520.2577$$

Compute the optimal boundary condition:

$$\Psi^* = \begin{bmatrix} \eta_s^* \\ \eta_u^* \end{bmatrix} = \Lambda^{-1} b$$

$$= [0.1517 \ 0.0638 \ 0.4988 \ 0.0483 \ -0.4536 \ -0.1043 \ 0.2021 \ -0.5494 \ -0.0386]^T$$

Compute the Optimal Output-transition Solution

Compute the optimal control input:

$$u^*_{oot}(t) = \begin{cases} U_u A_u^{k-k_i+r-1}[\eta^*_u - \overline{\eta}_u] & \text{if } k \le k_i - r \\ B^T(A^T)^{k_f-k-1} G^{-1}_{(k_i,k_f)}[x^*(k_f) - A^{k_f-k_i-r+1}x^*(k_i)] & \text{if } k_i - r < k < k_f \\ U_s A_s^{k-t_f}[\eta^*_s - \overline{\eta}_s] & \text{if } k \ge k_f \end{cases} \qquad (59)$$

where the optimal boundary states are given by:

$$x^*(k_i) = T^{-1}\left[\xi^T \underline{\eta_s^*}^T \eta_u^{*T} \underline{\eta_c^T}\right]^T$$

$$= [0.0511 \ 0.0010 \ 0.0034 \ -0.0026 \ -0.0380 \ 0.0992 \ -0.0004 \ 0.0004 \ -0.0843 \ 0.0655]^T$$

$$x^*(k_f) = T^{-1}\left[\overline{\xi}^T \eta_s^{*T} \overline{\eta}_u^T \overline{\eta}_c^T\right]^T$$

$$= [1 \ 0.0004 \ 0.0754 \ -0.1417 \ -0.3460 \ 0.0144 \ -0.1728 \ 0.2101 \ -0.2256 \ -0.1956]^T$$

Compute the optimal output-transition cost:

$$J^*_{oot} = \Psi^{*T}\Lambda\Psi^* - 2\Psi^{*T}b + c$$

$$= 1.4067$$

Simulation results. The discrete optimal output-transition input signal, u*$_{oot}$(k), which is applied to the motor that positions the read/write head is shown in FIG. 8. The output trajectory of the read/write head when the optimal input of FIG. 8 is applied to the motor is illustrated in FIG. 9. As shown in FIG. 8, a discrete pre-actuation input signal 110 is applied to move the read/write head prior to a transition-time interval (again extending from 0.005 sec. to 0.01 sec in this example). During the transition-time interval, a discrete input signal 112 is applied to move the read/write head. After the transition-time interval, a discrete post-actuation input signal 114 is applied. A horizontal line 116 in FIG. 9 illustrates that prior to the transition-time interval, the read/write head does not move from a first position. During the transition-time interval, the read/write head follows a trajectory 118 as it moves to a second position, indicated by a horizontal line 120. At the second position, the read/write head is also stable and does not move. Thus, a discrete input comprising a plurality of pulses, including both a pre-actuation input and a post-actuation input is employed, and the read/write head is again efficiently moved between the two positions, while achieving the desired optimization criterion.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for controlling an element that is part of a system so that for an instance in which it is necessary to reposition the element, the element is moved between a first position and a second position during a transition-time interval, and so that the element only moves during the transition-time interval and is precisely positioned both immediately before and after the transition-time interval, comprising the steps of:
   (a) providing a model of the system;
   (b) using the model for characterizing internal dynamics of the system in which energy applied to the system outside the transition-time interval is hidden so that the element does not move, other than during the transition-time interval;
   (c) for a selected optimization criterion, determining optimal internal states at a beginning and an end of a movement of the element between the first position and the second position; and
   (d) based upon the optimal internal states, determining an optimal control input signal for a transition-interval input, and at least one of a pre-actuation input and a post-actuation input acting on the element to cause the element to move from the first position to the second position so as to achieve the selected optimization criterion, wherein the pre-actuation input applies energy to the system before the transition-time interval, the post-actuation input applies energy to the system after the transition-time interval, and the transition-interval input applies energy to the system during the transition-time interval.

2. The method of claim 1, wherein the selected optimization criterion is to cause the element to move between the first position and the second position with substantially a minimum input energy.

3. The method of claim 1, wherein the selected optimization criterion is to cause the element to move between the first position and the second position in substantially a minimum transition-time interval.

4. The method of claim 1, wherein the pre-actuation input is uniquely specified in terms of an unstable internal state component.

5. The method of claim 4, wherein the post-actuation input is uniquely specified in terms of a stable internal state component, and wherein the unstable internal state component and the stable internal state component are the only components of boundary states for the first position and the second position that can be varied to ensure that the element does not move as a result of the energy applied to the system other than during the transition-time.

6. The method of claim 1, wherein the control input signal is defined as a function of a transition state difference related to the difference between the first position and the second position.

7. The method of claim 1, wherein at least one of the pre-actuation input, the post-actuation input, and the transition-interval input comprises a periodically varying signal at one or more frequencies selected to produce a force that acts on the element without causing the element to move prior to or after the transition-time interval.

8. The method of claim 1, wherein to move the element during the transition-time interval, further comprising the step of applying the transition-interval input signal during the transition-time interval, as well as applying the post-actuation input after the transition-time interval, but not applying the pre-actuation input before the transition-time interval.

9. The method of claim 1, wherein to move the element during the transition-time interval, further comprising the step of applying the transition-interval input signal during the transition-time interval, as well as applying the pre-actuation input before the transition-time interval, but not applying the post-actuation input after the transition-time interval.

10. The method of claim 1, wherein the element comprises a read/write head of a nonvolatile memory device that is moved between the first position and the second position to provide access to different portions of a memory medium.

11. The method of claim 1, wherein the element is included in a nonlinear system.

12. The method of claim 1, wherein the element is moved between the first position and the second position to carry out a function, said function comprising one of:
    (a) scanning a surface;
    (b) reading data;
    (c) writing data;
    (d) positioning the element to implement a process;
    (e) positioning the element to access a desired material;
    (f) controlling a process as a function of a position to which the element is moved;
    (g) fabricating a component by moving the element; and
    (h) controlling operation of the system in which the element is included, as a function of a position to which the element is moved.

13. A memory medium storing machine readable instructions for controlling an element that is part of a system so that for an instance in which it is necessary to reposition the element, the element is moved between a first position and a second position during a transition-time interval, and so that the element only moves during the transition-time interval and is precisely positioned both immediately before and after the transition-time interval, the machine readable instructions, when executed by a computing device, carrying out the following steps:
    (a) accessing a model of the system;
    (b) using the model for characterizing internal dynamics of the system in which energy applied to the system outside the transition-time interval is hidden so that the element does not move, other than during the transition-time interval;
    (c) for a selected optimization criterion, determining optimal internal states at a beginning and an end of a movement of the element between the first position and the second position; and
    (d) based upon the optimal internal states, determining an optimal control input signal for a transition-interval input, and at least one of a pre-actuation input and a post-actuation input acting on the element to cause the element to move from the first position to the second position so as to achieve the selected optimization criterion, wherein the pre-actuation input applies energy to the system before the transition-time interval, the post-actuation input applies energy to the system after the transition-time interval, and the transition-interval input applies energy to the system during the transition-time interval.

14. A controller for moving an element that is part of a system during a transition-time interval, to achieve a selected optimization criterion, comprising:
    (a) a memory in which machine instructions are stored; and
    (b) a processor that is coupled to the memory, said processor executing the machine instructions to carry out a plurality of functions, including:
        (i) accessing a model of the system;
        (ii) using the model for characterizing internal dynamics of the system in which energy applied to the system outside the transition-time interval is hidden so that the element will not move other than during the transition-time interval;
        (iii) for the selected optimization criterion, determining optimal internal states at a beginning and an end of a movement of the element between the first position and the second position; and
        (iv) based upon the optimal internal states, determining an optimal control input signal for a transition-interval input and at least one of a pre-actuation input and a post-actuation input acting on the system to cause the element to move from the first position to the second position so as to achieve the selected optimization criterion, wherein the pre-actuation input applies energy to the system before the transition-time interval, the post-actuation input applies energy to the system after the transition-time interval, and the transition-interval input applies energy to the system during the transition-time interval.

15. The controller of claim 14, wherein the selected optimization criterion used causes the element to move between the first position and the second position with substantially a minimum input energy.

16. The controller of claim 14, wherein the selected optimization criterion used causes the element to move between the first position and the second position in substantially a minimum time.

17. The controller of claim 14, wherein the pre-actuation input is uniquely specified in terms of an unstable internal state component.

18. The controller of claim 17, wherein the post-actuation input is uniquely specified in terms of a stable internal state component, and wherein the unstable internal state component and the stable internal state component are the only components of boundary states for the first position and the second position that can be varied by the controller to ensure that the element does not move as a result of the energy applied to the system other than during the transition-time.

19. The controller of claim 14, wherein the control input signal is defined as a function of a transition state difference related to the difference between the first position and the second position.

20. The controller of claim 14, wherein at least one of the pre-actuation input, the post-actuation input, and the transition-interval input comprises a periodically varying signal at one or more frequencies selected to act on the element without causing the element to move prior to and after the predefined interval of time.

21. The controller of claim 14, wherein to move the element during the transition-time interval, the machine instructions further cause the processor to apply the transition-interval input signal during the transition-time interval, as well as applying the post-actuation input after the transition-time interval, but not applying the pre-actuation input before the transition-time interval.

22. The controller of claim 14, wherein to move the element during the transition-time interval, the machine instructions further cause the processor to apply the transition-interval input signal during the transition-time interval, as well as applying the pre-actuation input before the transition-time interval, but not applying the post-actuation input after the transition-time interval.

23. The controller of claim 14, wherein the processor produces an output signal adapted to drive a read/write head of a nonvolatile memory device that is moved between the first position and the second position to provide access to different portions of a memory medium.

24. The controller of claim 14, wherein the processor is adapted to produce a non-linear output signal.

25. The controller of claim 14, wherein a control function implemented by the controller comprises one of:

(a) scanning a surface;
(b) reading data;
(c) writing data;
(d) positioning an element to implement a process;
(e) positioning an element to access a desired material;
(f) controlling a process;
(g) fabricating a component; and
(h) controlling operation of a system in which the element is moved from time-to-time.

26. A method for moving an element that is part of a system, between a first position and a second position during a transition-time interval, to achieve at least one of a minimum transition-time interval and a minimum energy for moving the element between the first position and the second position, comprising the steps of:

(a) determining a relative degree of the system;
(b) finding an inverse input for the system;
(c) selecting a transformation matrix to convert system equations that define the system, into an output tracking form;
(d) transforming the system equations into the output tracking form;
(e) decoupling internal dynamics of the system to produce decoupled internal dynamics;
(f) computing parameters for the decoupled internal dynamics; and
(g) determining an optimal output-transition solution as a function of the parameters, for defining an optimal control input for adding at least one of a pre-actuation energy and a post-actuation energy to the element, without causing movement of the element other than during the transition-time interval.

* * * * *